(12) United States Patent
Zhang et al.

(10) Patent No.: US 9,171,372 B2
(45) Date of Patent: Oct. 27, 2015

(54) DEPTH ESTIMATION BASED ON GLOBAL MOTION

(75) Inventors: Rong Zhang, San Diego, CA (US); Ying Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 749 days.

(21) Appl. No.: 13/301,225

(22) Filed: Nov. 21, 2011

(65) Prior Publication Data

US 2012/0127270 A1    May 24, 2012

Related U.S. Application Data

(63) Continuation-in-part of application No. 12/953,310, filed on Nov. 23, 2010.

(51) Int. Cl.
*H04N 13/02* (2006.01)
*G06T 7/00* (2006.01)

(52) U.S. Cl.
CPC .................................. *G06T 7/0071* (2013.01)

(58) Field of Classification Search
CPC ............... G06T 7/0071; G06T 7/2006; G06T 2207/10016; G06T 2207/10021; G06T 2207/10068; G06T 2207/20021; G06T 2207/20144; G06T 2207/30028; G06T 2207/30196; G06T 2207/30224; G06T 7/0075; G06T 7/0085; G06T 7/2033
USPC ........................................................... 348/43
See application file for complete search history.

(56) References Cited

U.S. PATENT DOCUMENTS

| | | | |
|---|---|---|---|
| 5,784,115 A | 7/1998 | Bozdagi | |
| 6,339,617 B1 | 1/2002 | Ueda | |
| 7,421,101 B2 | 9/2008 | Georgescu et al. | |
| 7,903,880 B2 * | 3/2011 | Wyatt et al. | 382/199 |
| 2002/0118761 A1 | 8/2002 | Lee | |

(Continued)

FOREIGN PATENT DOCUMENTS

| | | |
|---|---|---|
| CN | 1330493 A | 1/2002 |
| CN | 101479765 A | 7/2009 |

(Continued)

OTHER PUBLICATIONS

Donghyun Kim, et al., "A Stereoscopic Video Generation Method Using Stereoscopic Display Characterization and Motion Analysis" IEEE Transactions on Broadcasting, IEEE Service Center, Piscataway, NJ, US, vol. 54, No. 2, Jun. 1, 2008, pp. 188-197, XP011203136 ISSN: 0018-9316 abstract.

(Continued)

*Primary Examiner* — Jessica M Prince
(74) *Attorney, Agent, or Firm* — Brent Boyd

(57) ABSTRACT

This disclosure describes techniques for estimating a depth of image objects for a two-dimensional (2D) view of a video presentation. For example, a plurality of feature points may be determined for a 2D view. The plurality of feature points may be used to estimate global motion, e.g., motion of an observer (e.g., camera), of the 2D view. For example, the plurality of feature points may be used to generate a global motion frame difference. The global motion frame difference may be used to create a depth map for the 2D view, which may be used to generate an alternative view of the video presentation that may be used to display a three-dimensional (3D) video presentation.

28 Claims, 14 Drawing Sheets

(56) References Cited

U.S. PATENT DOCUMENTS

| | | | |
|---|---|---|---|
| 2003/0117611 A1 | 6/2003 | Chon et al. | |
| 2005/0041842 A1 | 2/2005 | Frakes et al. | |
| 2006/0171594 A1 | 8/2006 | Avidan et al. | |
| 2007/0024614 A1 | 2/2007 | Tam et al. | |
| 2007/0041445 A1 | 2/2007 | Chen et al. | |
| 2008/0095436 A1 | 4/2008 | Kim et al. | |
| 2008/0187219 A1* | 8/2008 | Chen et al. | 382/173 |
| 2008/0205791 A1 | 8/2008 | Ideses et al. | |
| 2008/0247670 A1 | 10/2008 | Tam et al. | |
| 2008/0258860 A1 | 10/2008 | Collins et al. | |
| 2009/0010507 A1* | 1/2009 | Geng | 382/128 |
| 2009/0116732 A1* | 5/2009 | Zhou et al. | 382/154 |
| 2009/0324062 A1* | 12/2009 | Lim et al. | 382/162 |
| 2010/0149422 A1* | 6/2010 | Samuelsson et al. | 348/699 |
| 2011/0115790 A1 | 5/2011 | Yoo et al. | |
| 2011/0311137 A1* | 12/2011 | Liu et al. | 382/173 |
| 2012/0127267 A1 | 5/2012 | Zhang et al. | |

FOREIGN PATENT DOCUMENTS

| | | |
|---|---|---|
| CN | 101640809 A | 2/2010 |
| JP | 2000253422 A | 9/2000 |
| JP | 2001520781 A | 10/2001 |
| JP | 2002094987 A | 3/2002 |
| JP | 3636677 B2 | 4/2005 |
| JP | 2006216046 A | 8/2006 |
| JP | 3823767 B2 | 9/2006 |
| JP | 2009042897 A | 2/2009 |
| JP | 2009514103 A | 4/2009 |
| JP | 2010140476 A | 6/2010 |
| KR | 20060007816 A | 1/2006 |
| KR | 20080035213 A | 4/2008 |
| WO | WO-9940726 A2 | 8/1999 |
| WO | WO-2007050707 A2 | 5/2007 |
| WO | 2009096912 A1 | 8/2009 |
| WO | WO-2010116400 A1 | 10/2010 |

OTHER PUBLICATIONS

Donghyun Kim., et al., "Stereoscopic Video Generation Method using Motion Analysis", 3DTV Conference, 2007, IEEE, PI, May 1, 2007, pp. 1-4, XP031158176, ISBN: 978-1-4244-0721-7.

International Search Report and Written Opinion—PCT/US2011/061962—ISA/EPO—Apr. 26, 2012.

Pourazad M T., et al., "An H.264-based scheme for 2D to 3D video conversion", IEEE Transactions on Consumer Electronics, IEEE Service Center, New York, NY, US, vol. 52, No. 2, May 1, 2009, pp. 742-748, XP011270932, ISSN: 0098-3063.

Cheng, et al., "3D Stereo Imaging Technology from 2D Image Sequence," Proceedings of the 2008 3rd International Conference on Innovative Computing Information and Control [Online] 2008, 4 pp.

* cited by examiner

DEPTH ESTIMATION BASED ON GLOBAL MOTION

This application is a continuation in part of U.S. application Ser. No. 12/953,310 titled "DEPTH ESTIMATION BASED ON GLOBAL MOTION" filed Nov. 23, 2010, the entire contents of which are incorporated herein by reference.

TECHNICAL FIELD

This disclosure relates generally to the generation of three-dimensional (3D) video. More specifically, this disclosure relates to the creation of a depth map for an existing two-dimensional (2D) video presentation that may be used to generate an alternative view for display of a three-dimensional (3D) video presentation.

BACKGROUND

In recent years, technology (e.g., televisions, dvd players, set top boxes, blu-ray players, computers, and the like) has been developed to allow for 3D video presentations in video display devices. However, most existing video content (e.g., stored, downloaded, and/or streaming video content) is only configured to be displayed in 2D. As such, it may be desirable to convert an existing digital representation of a 2D video presentation into a 3D presentation. To do so, it may be desirable to analyze a 2D video presentation to determine a depth of video objects in relation to one another. A representation of video object depth may be referred to as a depth map. Determination of object depth may be used to generate a video presentation that appears in 3D to a user.

SUMMARY

Global motion may be described as camera motion during video capture. Some examples of global motion movements include camera left and right panning, up and down tilting, and/or various other effects such as zoom-in and zoom-out. This disclosure describes techniques for estimating depth of image objects of a 2D view of a video presentation that includes estimating global motion of the 2D view, e.g., estimating motion of one or more stereoscopic cameras that captured the 2D view. This disclosure also describes techniques for estimating global motion based on a subset of pixels of an image. This disclosure further describes techniques for determining a depth map for an image based on a global motion compensated frame difference.

In some examples, estimating global motion may provide for improvements in converting a 2D view of a video presentation such that the video presentation may be perceived to have depth, e.g., a 3D video presentation. For example, estimating depth based on global motion may provide for generation of an alternative view of a video presentation. The alternative view may be displayed in conjunction with the original 2D view for the display of the video presentation such that it appears substantially 3D to a viewer.

According to one example, a method is described herein. The method includes determining, via an image processing module of a computing device for a two-dimensional (2D) view of a video presentation, an optical flow for at least one frame of the 2D view, wherein the optical flow is a representation of an apparent motion of object brightness patterns in a visual plane caused by relative motion between an observer of the 2D view and objects of the 2D view. The method further includes estimating, by the image processing module and based on the determined optical flow, global motion for the at least one frame. The method further includes adjusting, by the image processing module, the optical flow based on the estimated global motion to create a global motion-adjusted optical flow for the at least one frame. The method further includes generating, by the image processing module, a depth map for the 2D view of the video presentation based on the global motion-adjusted optical flow.

According to another example, an apparatus is described herein. The apparatus includes an optical flow determination module that determines, for a two-dimensional (2D) view of a video presentation, an optical flow for at least one frame of the 2D video presentation, wherein the optical flow is a representation of an apparent motion of object brightness patterns in a visual plane caused by relative motion between an observer of the 2D view and objects of the 2D view. The apparatus further includes a global motion estimation module that estimates, based on the determined optical flow, global motion for the at least one frame. The apparatus further includes a global motion adjustment module that adjusts the optical flow based on the estimated global motion to create a global motion-adjusted optical flow for the at least one frame. The apparatus further includes a mask/depth map creation module that generates a depth map for the 2D view of the video presentation based on the global motion-adjusted optical flow.

According to another example, a computer-readable storage medium is described herein. The computer-readable storage medium stores instructions that upon execution cause one or more processors to: determine, for a two-dimensional (2D) view of a video presentation, an optical flow for at least one frame of the 2D video presentation. The optical flow is a representation of an apparent motion of object brightness patterns in a visual plane caused by relative motion between an observer of the 2D view and objects of the 2D view. The instructions further cause the computing device to estimate, based on the optical flow, global motion for the at least one frame. The instructions further cause the computing device to adjust the optical flow based on the estimated global motion to create a global motion adjusted optical flow for the at least one frame. The instructions further cause the computing device to generate a depth map for the 2D view of the video presentation based on the global motion-adjusted optical flow.

According to another example, a device is described herein. The device includes means for determining, for a two-dimensional (2D) view of a video presentation, an optical flow for at least one frame of the 2D video presentation. The optical flow is a representation of an apparent motion of object brightness patterns in a visual plane caused by relative motion between an observer of the 2D view and objects of the 2D view. The device further includes means for estimating, based on the optical flow, global motion for the at least one frame. The device further includes means for adjusting the optical flow based on the estimated global motion to create a global motion-adjusted optical flow for the at least one frame. The device further includes means for generating a depth map for the 2D view of the video presentation based on the global motion-adjusted optical flow.

According to another example, this disclosure describes a method of determining a depth map for a two-dimensional view of a video presentation. The method includes determining, via an image processing module of a computing device for a two-dimensional (2D) view of a video presentation, a plurality of feature points for a frame of a video presentation. The method further includes determining global motion for the frame based on the plurality of feature points. The method further includes generating a depth map for the frame based on the determined global motion.

According to another example, a device configured to determine a depth map for a two-dimensional (2D) view of a video presentation. The device includes an image processing module configured to determine a plurality of feature points for a frame of a video presentation, determine global motion for the frame based on the plurality of feature points, and generate a depth map for the frame based on the determined global motion.

According to another example, a device configured to determine a depth map for a two-dimensional (2D) view of a video presentation. The device includes means for determining a plurality of feature points for a frame of a video presentation. The device further includes means for determining global motion for the frame based on the plurality of feature points. The device further includes means for generating a depth map for the frame based on the determined global motion.

According to another example, a computer-readable storage medium is described herein. The computer-readable storage medium includes instructions that upon execution cause one or more processors to: determine a plurality of feature points for a frame of a video presentation, determine global motion for the frame based on the plurality of feature points, and generate a depth map for the frame based on the determined global motion.

The details of one or more examples are set forth in the accompanying drawings and the description below. Other features, objects, and advantages of the invention will be apparent from the description and drawings, and from the claims.

DETAILED DESCRIPTION

This disclosure describes techniques for estimating depth of image objects of a 2D view of a video presentation that includes estimating global motion of the 2D view, e.g., estimating motion of one or more monoscopic cameras that captured the 2D view. In some examples, estimating global motion may provide for improvements in converting a 2D view of a video presentation such that the video presentation may be perceived to have depth, e.g., a 3D video presentation. For example, the techniques of this disclosure provide for determining for at least on video frame, at least one initial indication of image depth (e.g., optical flow of at least one pixel), and, based on the initial indication, estimating global motion for the frame. The estimation of global motion may be used to compensate the initial indication of pixel motion, thereby improving accuracy in determining depth (e.g., foreground or background) of objects of the at least one video frame. Accordingly, a depth map may be generated for the at least one frame. The depth map may be used to generate at least one alternative view of the video presentation that may be used in conjunction with at least one other view (e.g., the 2D view), to display a 3D (e.g., stereoscopic) video presentation.

Figure 1:
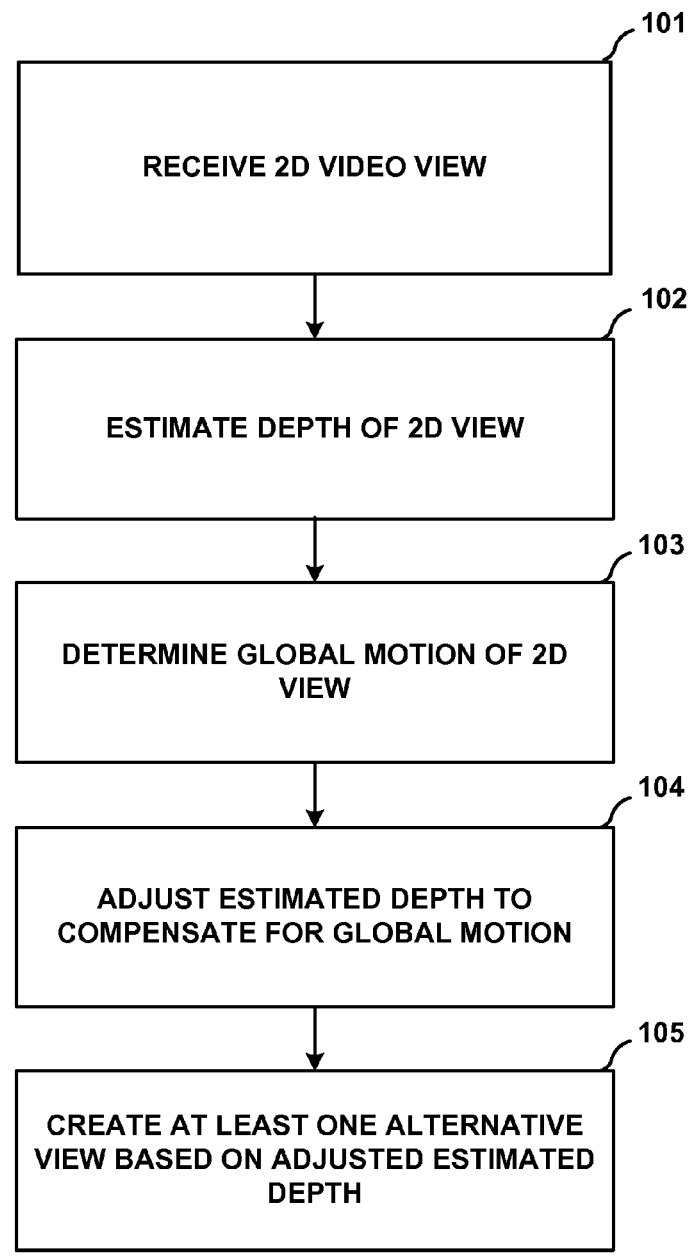
FIG. 1 is a flow diagram that illustrates one example of a method for converting a 2D video presentation to a 3D video presentation consistent with the techniques of this disclosure.

FIG. 1 is a flow diagram that illustrates one example method for estimating depth for a captured image consistent with the techniques of this disclosure. As shown in FIG. 1, the method includes acquiring a 2D (e.g., monoscopic) view of a video presentation (101). The 2D view may include an image captured with one or more monoscopic (single) cameras. The 2D view may instead be a single view of a plurality of views captured using one or more stereoscopic (more than one) cameras. The method further includes creating an initial indication of depth for one or more objects and/or pixels of the 2D view (102). The initial indication of depth may be created based on any of the techniques described herein, including for example blurriness, motion, block-based matching, segmentation, or optical flow techniques as described above. The method further includes determining global motion of at least one frame of the 2D view based on the initial indication of depth (103). The method further includes adjusting the initial indication of for objects and/or pixels of the 2D view based on the determined global motion (104). For example, where optical flow is used to determine an initial indication of image depth, the method includes modifying at least one optical flow vector for at least one pixel of the 2D view based on the determined global motion, to create a global motion-adjusted optical flow vector for the at least one pixel. The method further includes creating at least one alternative view of the 2D view based on the adjusted depth map (105). The method may further include presenting a 3D video using the generated alternative view of the 2D view. For example, the 2D view of the video presentation may be displayed as a left view of the 3D video presentation, while the alternative view may be displayed as a right view of the 3D video presentation. A difference between the right and left views may cause one or more images of the 3D video presentation to be perceived as having depth by a viewer.

Figure 2:
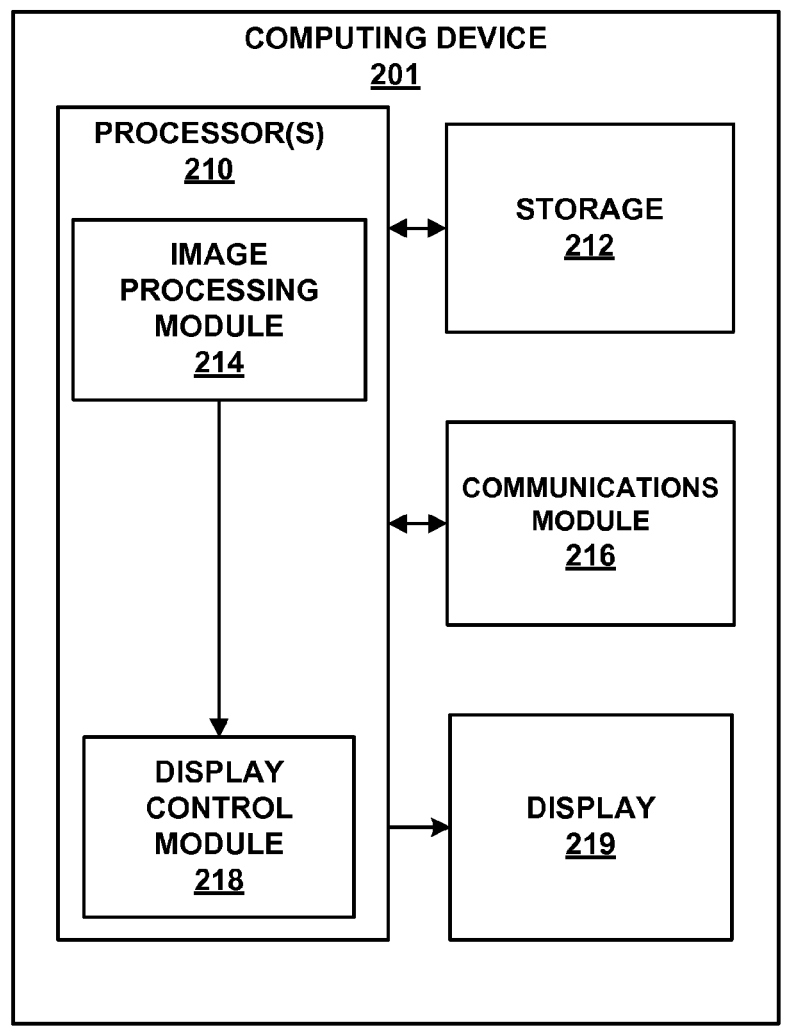
FIG. 2 is a block diagram that illustrates one example of a computing device configured to estimate depth for a 2D video presentation consistent with the techniques of this disclosure.

FIG. 2 is a block diagram illustrating an example arrangement of a computing device 201 that may be used to practice the techniques of this disclosure. Computing device 201 may be any device configured to process one or more 2D video views to create a 3D representation of the one or more 2D video views. Non-limiting examples of computing devices 201 that may be used to practice the techniques of this disclosure include desktop computers, laptop computers, tablet computing devices, smart phones, netbooks, televisions, video game consoles, portable video game units, or any other computing device configured to process video data.

As shown in the example of FIG. 2, computing device 201 includes one or more processors 210. The one or more processors 210 are a component of computing device 201 configured to execute instructions to cause the computing device to perform functions, such as depth estimation techniques of this disclosure. For example, processor(s) 210 may be configured to execute instructions stored by storage component 212. Storage component 212 may include one or more short or long-term memory storage components such as a computer hard disc, Flash memory, or random access memory (RAM) component. In one example, processor(s) 210 may comprise one or more central processing units (CPU) of computing device 201. In other examples, processor(s) 210 may instead or in addition include one or more graphics processing units (GPU), application specific integrated circuits (ASIC), field programmable gate array (FPGA), specific logic or hardware, or other like processing components.

As shown in FIG. 2, processor(s) 210 include an image processing module 214. According to the depicted example, image processing module 214 includes instructions stored by storage component 212 and executable by one or more processors 210 to perform the techniques described herein. Upon execution of instructions stored in storage component 212, processor(s) 210 may be considered a specific machine that is configured to perform the techniques of this disclosure. For example, the execution of instructions by processor(s) 210 may cause processor(s) 210 to estimate depth for a 2D view of a video presentation while taking into account global motion of the 2D view of the video presentation.

Image processing module 214 may include dedicated hardware or firmware configured to perform the various techniques described herein. According to these examples, the hardware or firmware associated with image processing module 214 may be considered part of processor(s) 210 as shown in FIG. 2. For example, image processing module 214 may comprise one or a plurality of specialized hardware components configured to perform the techniques of this disclosure. For example, image processing module 214 may include any combination of graphics processing components, specialized hardware (e.g., an ASIC), programmable hardware (firmware, FPGA), or any other specialized and/or programmable hardware configured to operate consistent with the techniques of this disclosure.

According to one example, image processing module 214 may acquire a 2D video view via a digital representation of the video view stored by storage component 212. In another example, image processing module 214 may acquire a 2D video view from one or more other computing devices via communications module 216. Communications module 216 may include one or more components to enable communications with other computing devices. For example, communications module 216 may facilitate communications via a wired or wireless network (e.g., the Internet). Accordingly, image processing module 214 may acquire a 2D video stored on another computing device via communications module 216. According to another example, image processing module 214 may acquire a 2D video view directly from an image capture device (not shown in FIG. 2). For example, computing device 201 may include, or be communicatively coupled with, one or more camera devices configured to capture images. The one or more camera devices may communicate captured images to image processing module 214 in real or close to real time. According to these examples, image processing module 214 may apply the techniques described herein to frames of captured images in real or close to real time. For example, image processing module 214 may process received 2D image frames for 3D display as images are captured by one or more camera devices.

According to the techniques of this disclosure, image processing module 214 may acquire a 2D video view, and determine an initial indication of depth for at least one object/pixel of the 2D video view. Image processing module 214 may further determine global motion for the 2D video view. Image processing module 214 may further adjust the initial indication of depth of the at least one object/pixel of the 2D video view based on the determined global motion. Image processing module 214 may then use the adjusted indication of depth to create at least one alternate view of the 2D video view. The alternate view may be configured to be used in conjunction with the acquired 2D view, or another view, to display a 3D video.

According to one example, image processing module 214 may communicate a created alternative view to storage component 212 for storage. According to another example, computing device 201 may communicate a created alternative view to another computing device via communications module 216 for storage. According to another example, computing device 201 may operate as a server device to stream (e.g., via HTTP or similar streaming protocol) a created alternative view to another computing device for presentation to a user. For example, computing device 201 may stream a created alternative view to a computing device configured to display stereoscopic images in 3D to a user.

In some examples, as shown in FIG. 2, a computing device 201 configured to estimate depth as described herein may further include a display control module 218 configured to communicate with one or more displays 219 to display one or more images to a viewer. Similar to image processing module 214, as shown in FIG. 2, display control module 218 may comprise software instructions executable by processor(s) 210 to control the one or more displays 219. In other examples not depicted in FIG. 2, display control module 218 may instead or in addition include specialized hardware configured to control the one or more displays 219.

The one or more displays 219 may be part of computing device 201 (e.g., laptop, netbook, smartphone, portable video game device, tablet computer, or the like) or may be communicatively coupled to computing device 201 (e.g., desktop computer monitor, television display video game console, or the like). The one or more displays 219 may be configured to display stereoscopic images in the sense that the one or more displays 219 may communicate first and second images intended to be perceived by a viewer's right and left eyes, respectively. In some such examples, a user may wear specialized glasses that cause a first image to be viewed independently by a viewer's right eye, and the second image to be viewed independently by the viewer's left eye. Display control module 218 may be configured to communicate with display 219 to cause the respective right and left images to be displayed. For example, display control module 218 may be configured to communicate signals that control one or more display elements (e.g., liquid crystal, light emitting diode, plasma display elements) of display 219 to cause the display elements to emit light, such as light of different colors, frequencies, or intensities to cause the respective right and left images to be displayed to a viewer.

Figure 2A:
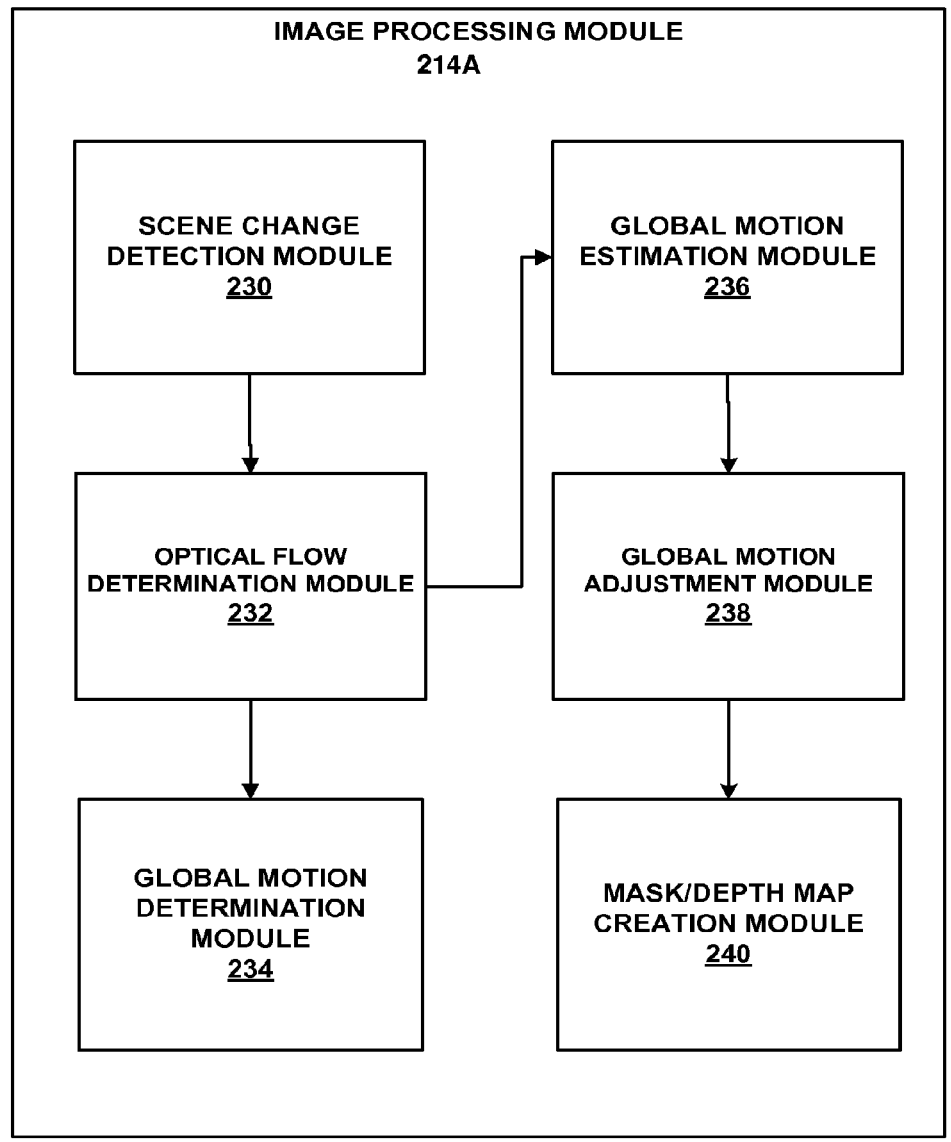
FIG. 2A is a block diagram that illustrates one example of an image processing module consistent with the techniques of this disclosure.

FIG. 2A is a block diagram that illustrates one example of an image processing module 214, image processing module 214A, consistent with the techniques of this disclosure. According to the example of FIG. 2, image processing module 214A includes various sub-modules, for example: scene change detection module 230, optical flow determination module 232, global motion determination module 234, global motion estimation module 236, global motion adjustment module 238, and mask/depth map creation module 240. Like image processing module 214 depicted in FIG. 2, the various sub-modules 230, 232, 234, 236, 238, and 240 may comprise any combination of software executable on hardware, such as a processor, and/or any other dedicated hardware configured to perform any of the techniques described herein.

Scene change detection module 230 may be configured to analyze one or more frames of a video presentation, to determine whether the one or more frames represents a scene change, or a substantially difference between the frames. Examples of techniques that may be used by scene change detection module 230 are described below with respect to step 302 in FIG. 3.

Optical flow determination module 232 may be configured to determine an initial indication of object depth, e.g., an optical flow for at least one pixel of a video frame. For example, optical flow determination module 232 may analyze one or more frames of a video presentation to determine an optical flow for at least one pixel of the one or more frames, e.g., as described in further detail below with respect to FIG. 5.

Global motion determination module 234 may be configured to analyze one or more frames of a video presentation to determine whether the one or more frames include global motion. Global motion may be described as camera motion during video capture. Examples of global motions include camera left and right panning, up and down tilting, zoom-in and zoom-out, and similar movements. According to one example, global motion determination module 234 may be configured to receive an initial indication of object depth (e.g., at least one optical flow vector) from optical flow determination module 232. According to this example, global motion determination module 234 may analyze the received initial indication of object depth to determine whether or not global motion exists in the one or more frames. Accordingly, image processing module 214A may skip global motion estimation and/or adjustment techniques, if global motion determination module 234 determines no global motion to exist for the one or more frames. In one example, global motion determination module 234 may determine whether one or more frames of a video presentation include global motion or not as described below with respect to step 305 of FIG. 3 below.

Global motion estimation module 236 may be configured to estimate global motion for at least one frame of a video presentation (e.g., if global motion is determined to exist by global motion determination module 234). For example, global motion estimation module 236 may receive from optical flow determination module 232 an indication of an optical flow vector for at least one pixel of a video frame. Global motion estimation module 236 may analyze one or more received optical flow vectors to determine at least one indication of global motion, e.g., a global motion parameter of a parameter model as described below with respect to step 306 depicted in FIG. 3.

Global motion adjustment module 238 may be configured to modify an initial indication of object depth to account for global motion. For example, global motion adjustment module 238 may receive one or more optical flow vectors from optical flow determination module 232. Global motion adjustment module 238 may further receive one or more global motion parameters from global motion estimation module 236. According to one example, global motion adjustment module 238 may apply the received global motion parameters to the one or more optical vectors, to create a global motion-adjusted optical flow for at least one frame of a video presentation. One example of a technique that may be used by global motion adjustment module 238 to create a global motion-adjusted optical flow is described below with respect to step 307 of FIG. 3.

Mask/depth map creation module 240 may be configured to receive a global motion-adjusted optical flow for at least one pixel from global motion adjustment module 238, and determine a depth map for at least one frame based on the global motion-adjusted optical flow. For example, mask/depth map creation module 240 may classify image pixels as background and/or foreground (e.g., as described below with respect to step 308 in FIG. 3), create an initial foreground/background mask based on the classification (e.g., as described with respect to step 309 in FIG. 3), refine an initial mask (e.g., as described with respect to step 310 in FIG. 3) and/or post process an initial mask (e.g., as described with respect to step 311 in FIG. 3). According to various examples described herein, mask/depth estimation module 240 may further generate a depth map for at least one frame of a video presentation (e.g., as described below with respect to step 312 in FIG. 3).

Various techniques are described below as being performed by image processing module 214 in general. One of skill in the art will appreciate that the various techniques described herein may also or instead be performed by specific sub-modules of an image processing module 214, such as sub-modules 230, 232, 234, 236, 238, and 240 of image processing module 214A described above with respect to FIG. 2A.

Depth of a 2D video presentation may be determined based on image blurriness, object movement, and/or optical flow (e.g., color changes due to motion of object brightness). However, these techniques may suffer from certain drawbacks. For example, such techniques may be based on one or more assumptions that may not be true for all video presentations or portions of a video presentation.

With the development of stereoscopic display technologies, stereoscopic or three-dimensional (3D) video has increasingly popularity. Due to these technologies, demand has increased significantly for 3D content such as movies, television programs, video games, and other content.

Many 3D display techniques utilize binocular vision, e.g., where slightly different images are provided that are perceived differently by a viewer's left and right eyes. Due to this perceived difference, a perception of depth is created for the user. However, most existing video content is only configured for viewing in 2D. For example, most existing video content only includes a primary view, and does not include any secondary views that can allow for 3D video rendering. Furthermore, many existing video cameras are only capable of capturing monoscopic video (e.g., only include a single camera, or multiple cameras to capture images from the same perspective), and are therefore not configured to capture images directly in 3D.

Converting a 2D video presentation to 3D video conversion may include generating one or more alternative views from an already known original 2D view. One aspect of such conversion techniques may include the estimation of relative depths of objects of captured video, so that the video may be played back such that a viewer perceives depth. In some examples, depth of image objects may be estimated prior to generating one or more alternative views.

Depth estimation may include the estimation of absolute or relative distances between object and camera plane, called depth, from one or more monoscopic (e.g., 2D) views. In some examples, depth information is represented by a grey-level image depth map. For example, pixels of an image may be assigned a value depending on their absolute or relative depth. In one particular example, a depth value of "0" indicates a largest distance between object and camera, while a depth value of "255" indicates a smallest distance.

An estimated depth map of a 2D image may be used to determine depth for presentation of 3D video. For example, an estimated depth map may be used to generate an angle of one or more alternative views of a video using depth image based rendering (DIBR) techniques. For example, an estimated depth map may be use to determine differences a between respective right and left images of a 3D video presentation that cause the 3D image to have depth when viewed.

A number of aspects of a 2D video may be used to estimate a depth of objects of a 2D image. For example, perspective geometry or temporal or 2D spatial cues may be used, for example, object motion and color, depending on a source of a 2D video. In cases where a video already includes two or more pre-captured views (e.g., stereoscopically captured using a plurality of cameras), a depth map can be obtained by epipolar geometry, based on intrinsic and/or extrinsic parameters of one or more cameras that captured the views. Such techniques may estimate disparity information (inverse proportional to object depth) by identifying correspondences of the same object in stereo views. Such techniques may also include local matching and global optimization methods, such as graph-cut and belief propagation.

Generally, a video frame can be regarded as a composition of one or more foreground objects and a background and/or background objects. From the camera focus's point of view, one may assume that the color intensities of defocused areas (e.g., background images) are more blurry compared to focused areas (e.g., foreground images). According to one example, depth of captured images may be determined based on a level of blurriness of image pixels.

Relative blurriness of image pixels may be based on gradient based measurement or frequency domain analysis. For example, it may be assumed for some videos or video frames that images with larger gradient values are less blurry, while images with smaller gradient values are more blurry. However, for other videos or frames, these assumptions may not be accurate. For example, a camera perspective may focus on far away image objects instead of objects near the camera. In addition, the above described image blur analysis may not be applicable to textureless regions of a foreground, since foreground homogeneous areas do not contain too many high frequency components. Thus, estimating image depth according to blurriness may not be accurate, because a lower level of blurriness may not always indicate a smaller depth (e.g., distance to a camera).

Other techniques for depth estimation may involve analysis of motion in a monoscopic 2D video. These techniques may rely on an assumption that closer objects (with respect to a perspective of a camera) are expected to appear larger and have more motion compared to far away objects.

Motion estimation may include estimating object movement between adjacent video frames. Motion estimation may include determining one or more motion vectors. A motion vector may be described as a vector that indicates object horizontal and/or vertical translational displacement between consecutive frames of a video presentation. For example, for certain video scene settings that include a static background, motion may be obtained by subtracting motion of an object from the static background. Motion estimation may be undesirable for some videos and/or frames of a video, due to the need for a static background. Another technique for estimating motion is to determine a difference between adjacent frames, instead of comparing a frame to a static background. According to this technique, motion may be identified based on pixel and/or window-based subtractions of color intensities of pixels of consecutive frames.

According to techniques where motion is used as an identification of depth, motion magnitude may be used to assign depth value for one or more frame pixel. For example, pixels with larger motion magnitude may be assigned with larger depth values. Similar to the use of blurriness for estimating depth, however, the use of motion as an indication of depth may also be based on assumptions that are not true for at least some videos. For example, objects that are substantially the same distance from a camera may move independently, but with different velocities. According to these examples, motion may not always be an adequate indicator of image depth, as a faster moving object may be the same distance away as a slower object. In another example, where an image remains static with no motion over a short time interval, motion may not be used to estimate depth.

Another technique that may be used for motion estimation is block-based matching. Block-based matching may be used in video compression. According to these techniques, one or more frames of a video are divided into blocks. Each block of a current frame may be compared to a block of the same size but displaced in a reference frame. A determined displacement associated with a smallest matching cost, for example, sum of absolute values of the matching error, may be identified as an estimated motion value for all the pixels in that block.

Another technique for estimating depth is image segmentation. Generally, pixels having the same or similar colors belong to the same object, while sharp intensity changes indicate object boundaries. It may be assumed that depth field is piece-wise smooth and discontinuity in depth is reflected by discontinuity in image intensity. According to these techniques, video frames are segmented into several regions, or segments. These segments are then assigned with different depth values. Although depth estimation of image segments may achieve more consistent depth maps compared to pixel-based estimations, computational complexity may be increased. In addition, some scenes that contain texture-like areas may be difficult to segment. Image segmentation may also be inadequate where segments suffered from color variance, for example, luminance changes of the same objects. Also, in some cases several different segments may be determined for one object, and/or pixels of one object may be classified into the same segment with pixels of another object. Thus, segmentation results may not be accurate enough when used for depth estimation, in some cases.

Instead of partitioning an image into several homogenous regions according to color intensity values, they can also be used directly in depth estimation. Some color information, for example, the Chrominance Cr component, may be used as a depth initialization for natural video scenes. One advantage of depth estimation from those components in certain color spaces is its simplicity. Chrominance components may be smooth for pixels belonging to the same object. Compared to segmentation based depth estimation, the depth maps directly generated from those color components may preserve object shape better and thus provide better spatial consistency. Although estimated depth values are far from accurate to a true depth, synthesized stereo pairs created according to such techniques may provide 3D effect to some extent.

Optical flow techniques may identify apparent motion of object brightness patterns in a visual plane caused by relative motion between an observer, for example a camera, and an object being observed. For example, optical flow of a video frame may be considered a motion field where each point is assigned with a velocity vector describing its movement. Optical flow techniques may include relating object velocities with pixel gradient-based intensity changes via a brightness constancy equation. Global or local optimization techniques may be used to calculate optical flow motion vectors for one or more frame pixels.

Unlike blurriness, motion, and other techniques described above, video frame smoothness measured from color intensity (e.g, optical flow) may be used to generate a relatively consistent depth map, both spatially and temporally. Accurately estimating a depth map may be important for reducing artifacts in presentation of a 3D video, such as flickering and local deformation in generated alternative virtual views.

Figure 3:
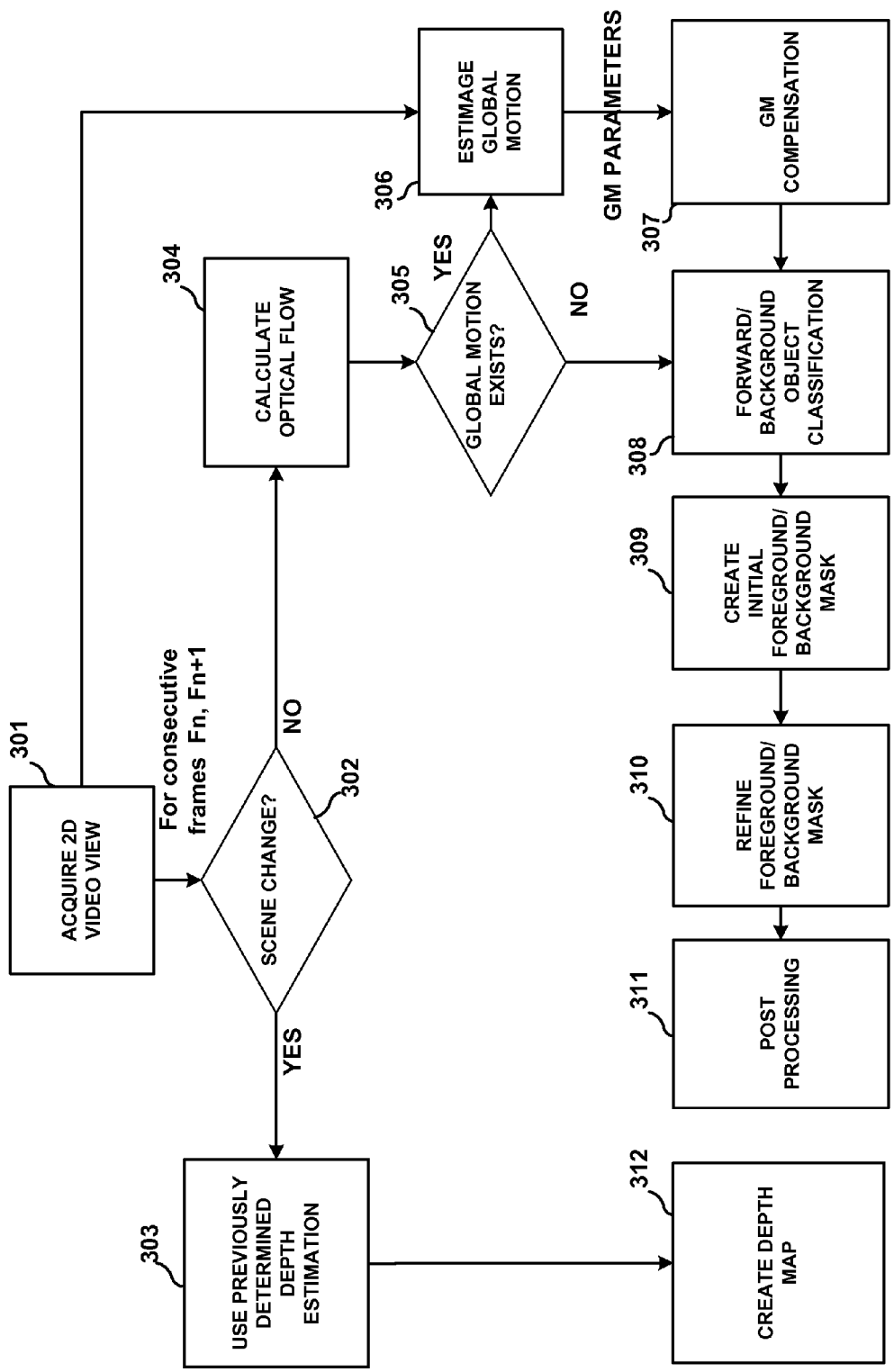
FIG. 3 is a flow diagram that illustrates one example of a method of creating a depth map for a 2D video presentation consistent with the techniques of this disclosure.

FIG. 3 is a flowchart illustrating one example of a method of estimating image depth of a 2D (e.g., monoscopic) view of a video presentation based at least in part on global motion of the video presentation. The various examples described herein, including the method of FIG. 3, are discussed as being performed by computing device 201, or components of computing device 201 (e.g., image processing module 214) depicted in FIG. 2. In other examples, the techniques described herein may be performed by any computing device or module, whether or not specifically described herein.

As depicted in FIG. 3, image processing module 214 may acquire a 2D view of a video presentation (301). The 2D view includes at least two consecutive frames, in a presentation order (e.g., presentation to a user, via one or more displays) of the video presentation. The technique depicted in FIG. 3 is described as being applied to a current ($f_N$) and a next ($f_N+1$) frame of a captured video presentation. In some examples, the techniques depicted in FIG. 3 may be applied a plurality of times, for a plurality of frames of a video presentation.

Image processing module 214 (e.g., scene change detection sub-module 230 depicted in FIG. 2A) may further determine whether a scene change exists between frames $f_N$ and $f_N+1$ (302). For example, image processing module 214 may determine a scene change where frame $f_N$ represents a substantially different scene than frame $f_N+1$ of the video presentation. It may be desirable to determine whether a scene change has occurred, because where frames $f_N$ and $f_N+1$ represent different captured scenes, estimation of depth based on optical flow and/or determined global motion may not be meaningful. Furthermore, detecting scene change may improve temporal (e.g., in time) consistency of video frame analysis. For example, where a scene change occurs between two temporally adjacent frames, a depth map of a current frame may not be temporally correlated to a previous one. As such, it may be desirable to avoid operations such as averaging a depth of several consecutive frames.

Accordingly, if a scene change is determined between frames $f_N$ and $f_N+1$ of a video presentation, image processing module 214 may skip depth estimation for frame $f_N$. Instead of estimating depth for frame $f_N$, image processing module 214 may use a depth estimation previously determined for one or more previous frames (e.g, a frame $f_N-1$) of the video presentation for the current frame $f_N$ (303).

Figure 4:
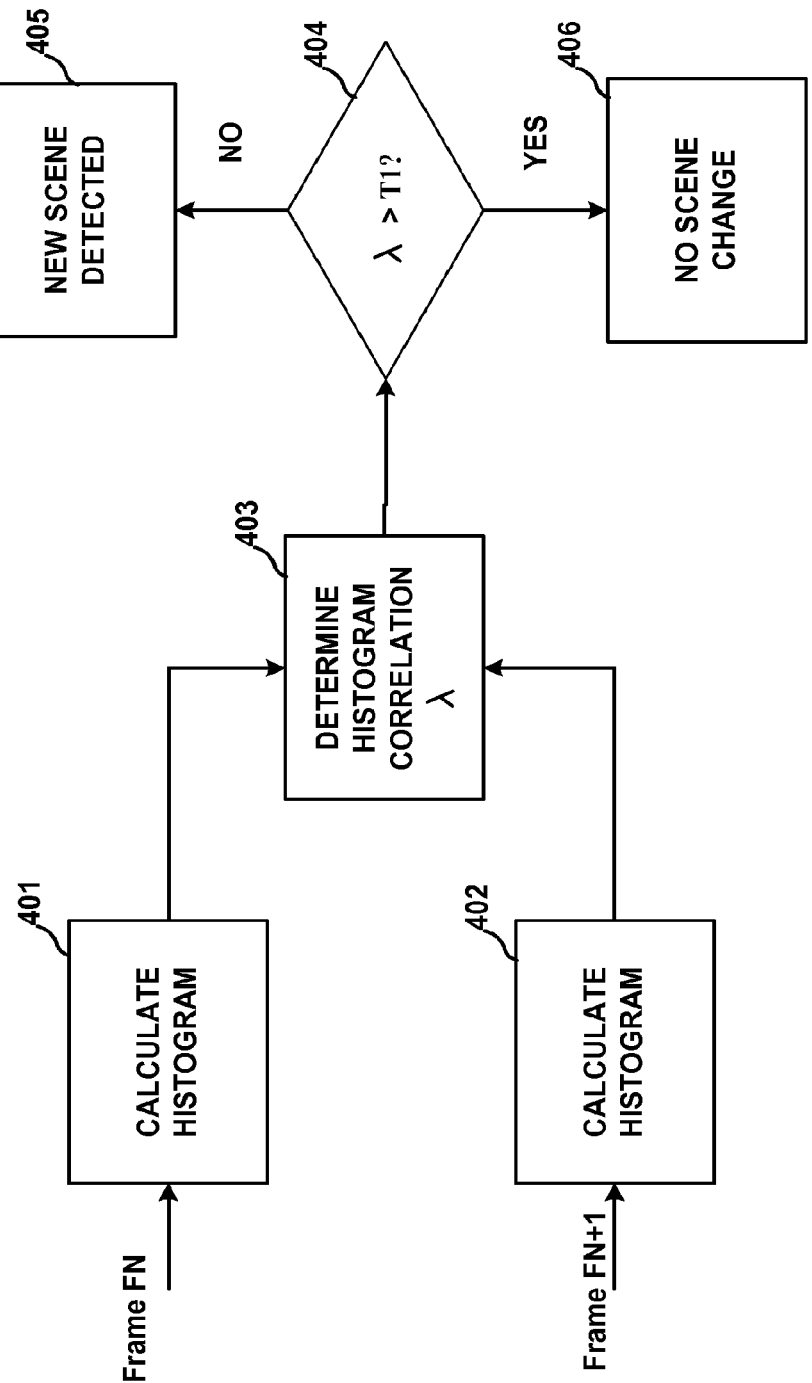
FIG. 4 is a flow diagram that illustrates one example of a method for determining whether a scene change occurred for at least one frame of a video presentation consistent with the techniques of this disclosure.

FIG. 4 is a flow chart diagram that illustrates one example of a technique for determining whether one or more frames of a video presentation include a scene change (e.g., step 302 as depicted in FIG. 3). According to the method depicted in FIG. 4 image processing module 214 (e.g., scene change detection sub-module 230 depicted in FIG. 2A) may detect whether a scene changed occurred based on an intensity histogram. According to this method, a histogram of relative intensity of pixel color may be determined for a current frame $f_N$ (401). A histogram of relative intensity of pixel color may also be determined for a next frame $f_N+1$ (402).

According to one example, an intensity histogram for frame $f_N$ may be represented by histogram value $H_N=\{h_{N,m}\}$, and an intensity histogram for frame $f_N+1$ may be represented by histogram value $H_{N+1}=\{h_{N+1,m}\}$. According to these examples, a histogram value for an $m_{th}$ bin may be a number of pixels that have intensity values that belong to the $m_{th}$ bin. In one example, a value of m may be m=0, 1, . . . . M–1.

According to these equations, M may represent a number of bins of the respective histograms. According to one such example, for an 8-bit color representation where pixel color intensities range from 0-255, a value of M may be 256. In other examples, to reduce a dimension of a histograms values $H_N$, $H_{N+1}$, a smaller value for M may be used.

Image processing module 214 may further determine a correlation coefficient λ between the respective histograms determined at steps 301 and 302 (403). According to one example, the correlation coefficient λ may be determined based on the following equation.

$$\lambda(H_N, H_{N+1}) = \frac{\sum_{m_1,m_2}(h_{N,m_1} - \overline{H}_N)(h_{N+1,m_2} - \overline{H}_{N+1})}{\sqrt{\left(\sum_{m_1}(h_{N,m_1} - \overline{H}_N)^2 \sum_{m_2}(h_{N+1,m_2} - \overline{H}_{N+1})^2\right)}}, \quad (1)$$

where:

$$\overline{H}_N = \frac{1}{M}\sum_{m=0}^{M} h_{N,m}$$

and, $$\overline{H}_{N+1} = \frac{1}{M}\sum_{m=0}^{M} h_{N+1,m}$$

As also depicted in FIG. 4, the image processing module 214 may further determine whether the correlation coefficient λ determined at step 403 is greater than a threshold value $T_1$ (404). The threshold value $T_1$ may be a predetermined value based on empirical analysis of scene changes in video presentations, but could be also be adaptively determined or defined in other ways. If the value of the correlation coefficient λ is less than the threshold value $T_1$, then image processing module 214 may determine that a new scene has been detected between frame $f_N$ and frame $f_N+1$ (405). However, if the value of the correlation coefficient λ is greater than or equal to the threshold value T1 (e.g., λ>=T1), image processing module 214 may determine that a new scene has not been detected between frame $f_N$ and frame $f_N+1$ (406).

According to the techniques illustrated in FIG. 4, if $f_N$ and frame $f_N+1$ belong to the same scene (e.g., no scene change), then the respective histograms $H_N$, $H_{N+1}$ determined at steps 401, 402 may be substantially similar, e.g., $H_N$, $H_{N+1}$ are highly correlated. In one example, if no scene change is present between frames $f_N$ and $f_N+1$, correlation coefficient λ determined at step 403 may be equal or close to a value of 1. Otherwise, correlation coefficient λ may have a smaller value, e.g., substantially less than a value of 1.

Referring back to FIG. 3, if image processing module 214 does not determine a scene change (302) between frames $f_N$ and $f_N+1$, image processing module 214 (e.g., optical flow determination sub-module 232 depicted in FIG. 2A) may determine an initial indication of depth for frames $f_N$ and $f_N+1$, e.g., an optical flow for at least one pixel of frames $f_N$ and $f_N+1$ (304). Optical flow may be described as an apparent motion of object brightness patterns in a visual plane caused by relative motion between an observer (e.g., a camera), and one or more objects being observed (e.g., captured by the observer). To determine optical flow for the at least one pixel, image processing modules 214 may relate object velocities with pixel gradient-based intensity changes via a brightness constancy equation. According to one example, image processing module 214 may determine a velocity vector $V_{x,y}$ for one or more pixels of a frame. In other examples not depicted in FIG. 3, image processing module 214 may determine an initial indication of based on techniques other than optical flow. For example, image processing module 214 may determine an initial indication of depth based on blurriness, motion, block-based matching, and/or segmentation techniques as described above.

According to one example, image processing module 214 may determine optical flow for at least one voxel of a video presentation. A voxel may be considered a volumetric point of an object in x, y, z real-world coordinates. The voxel may be projected onto a location (e.g., x, y location) of a camera plane (plane of image capture) at a time t. An intensity of the voxel may be represented by the value I(x,y,t). The intensity I(x,y,t) may represent an intensity of the voxel that appears in a plane of an observer (e.g., a camera) projected from the voxel. The value x may represent a horizontal index of a camera plane (plane of image capture), while the value y represents a vertical index of the camera plane. After a small time interval δt, at a time t+δt, the voxel may be projected at a new location (e.g., x, y location), (x+δx, y+δy, t+δt). If the time interval δt is relatively short, the intensity values I(x,y,t) may be assumed to be unchanged, for example represented by the following equation:

$$I(x,y,t) = I(x+\delta x, y+\delta y, t+\delta t) \qquad (2)$$

According to one example, image processing module 214 may determine a Taylor series for small movement within a short time period. For example, image processing module 214 may determine a Taylor series according to the following equation:

$$I(x+\delta x, y+\delta y, t+\delta t) \approx I(x, y, t) + \frac{\delta I}{\delta x}\delta x + \frac{\delta I}{\delta y}\delta y + \frac{\delta I}{\delta t}\delta t, \qquad (3)$$

where:

$\frac{\delta I}{\delta x}, \frac{\delta I}{\delta y},$ and $\frac{\delta I}{\delta t}$ are derivative operators of voxel intensity with respect to spatial horizontal direction x, spatial vertical direction y, and temporal direction t. If $\frac{\delta I}{\delta x}, \frac{\delta I}{\delta y},$ and $\frac{\delta I}{\delta t}$ are considered equivalent to $I_x$, $I_y$, and $I_t$, respectively, it follows that:

$$I_x \delta x + I_y \delta y + I_t \delta t = 0 \qquad (4),$$

and, $$I_x \frac{\delta I}{\delta x} + I_y \frac{\delta I}{\delta x} + I_t = 0, \qquad (5)$$

According to the above equations, a velocity vector (i.e., optical flow motion vector) for a voxel (pixel) may be described as:

$$V = \left[\frac{\delta x}{\delta y}, \frac{\delta y}{\delta t}\right] = [v_x, v_y]^T,$$

and a brightness constancy equation may be described as:

$$I_x v_x + I_y v_y + I_t = 0 \qquad (6),$$

For a given pixel location (e.g., x, y location) image processing module 214 may determine values $I_x$, $I_y$, and $I_t$ of equation (6). Values $I_x$, $I_y$, and $I_t$ may be described as derivatives along spatial horizontal, vertical and temporal directions, respectively. Image processing module 214 may determine value $I_t$ based on a difference between consecutive frames. Image processing module 214 may determine value $I_x$ based on applying a discrete differential filter (operator) to an original frame along a horizontal direction. Image processing module 214 may determine value $I_y$ based on applying a discrete differential filter (operator) to an original frame along a vertical direction. Once values have been determined for $I_x$, $I_y$, and $I_t$, $I_x$, $I_y$, and $I_t$ may be used to determine values for $v_x$ and $v_y$.

Accordingly, various techniques known in the relevant arts may be used to determine the values of $v_x$, $v_y$. For example, image processing module 214 may determine values $v_x$, $v_y$ based on constraints such as the Lucas-Canade (LK) optical flow method and the Horn Schunck (HS) method. Image processing module 214 may also use other techniques to determine values $v_x$, $v_y$.

Image processing module 214 (e.g., optical flow determination sub-module 232 depicted in FIG. 2A) may use the above described calculations to determine optical flow for one or more image pixels and generate an optical flow vector $V_{x,y}$ assigned to the one or more image pixels. Image processing module 214 may use optical flow vectors of to estimate depth for pixels, and/or for objects of a video frame. For example, image processing module 214 may assign a pixel with a larger optical flow magnitude a larger depth value, and a pixel with a smaller optical flow value a smaller depth value. In one specific example, where an 8-bit grey level scale is used to represent pixel depth, image processing module 214 may assign a depth value of 0 to a pixel that is further from a source (e.g., camera), and a depth of 255 to a pixel that is closer to the source.

Figure 5:
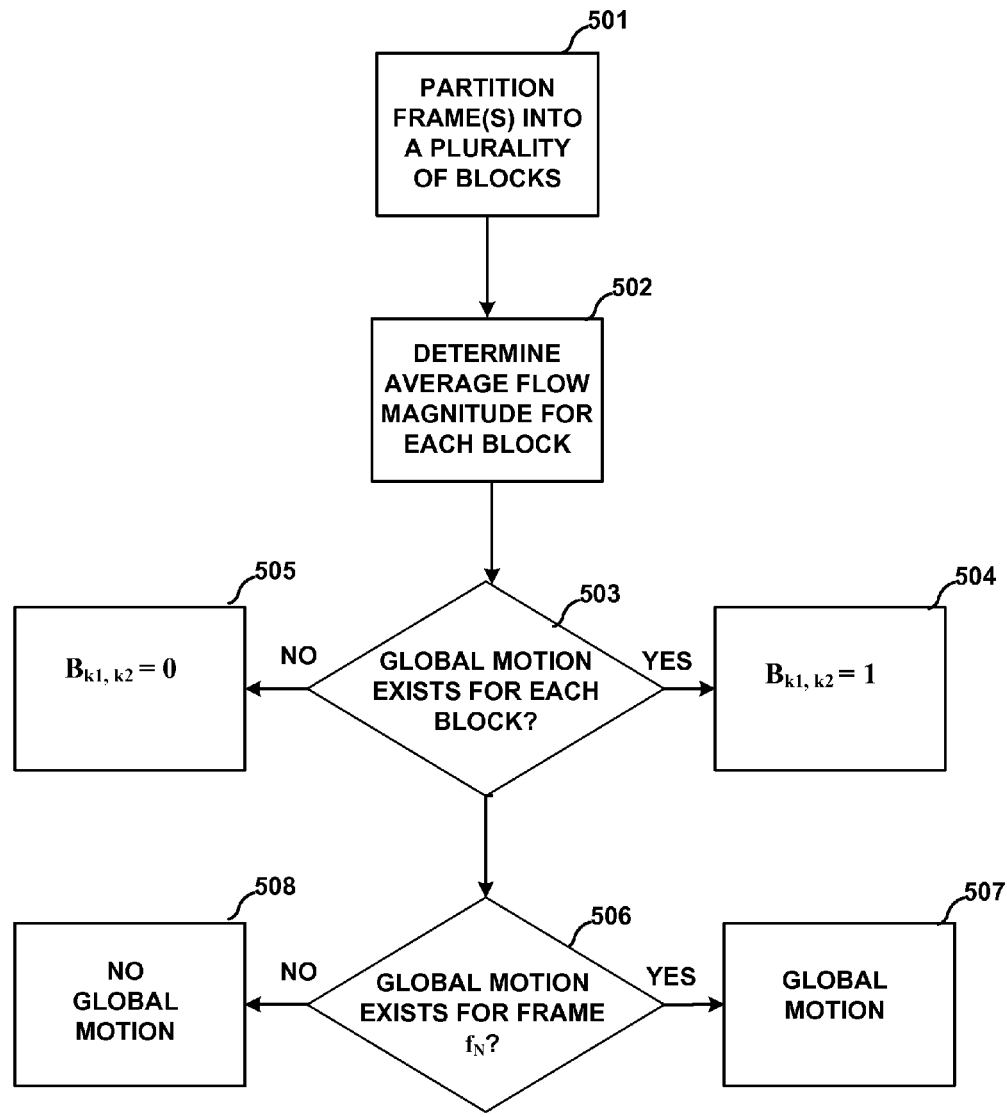
FIG. 5 is a flow diagram that illustrates one example of a method of determining whether or not global motion exists for at least one frame of a video presentation consistent with the techniques of this disclosure.

Referring back to FIG. 3, once an initial indication of depth has been determined for frames $f_N$ and $f_N+1$ (e.g., at step 304), the image processing module 214 may determine whether or not global motion exists for frame $f_N$ (305). FIG. 5 is a flow diagram that illustrates one example technique for determining whether or not frame $f_N$ includes global motion. According to the method of FIG. 5, image processing module 214 may partition frames $f_N$ and $f_N+1$ into a plurality of blocks (501). In one such example, image processing module 214 may partition frames $f_N$ and $f_N+1$ into L by L blocks. These partitioned blocks may be indexed by values $k_1$ and $k_2$, where $k_1$ represents a horizontal block index, and $k_2$ represents a vertical block index. Image processing module may determine, for each block $k_1$, $k_2$, an average flow magnitude $$\left( e.g., \frac{1}{L^2} \sum_{x=k_1 L}^{(k_2+1)L-1} \sum_{y=k_2 L}^{(k_2+1)L-1} |V_{x,y}| \right). \quad (502)$$

Image processing module 214 (e.g., global motion determination sub-module 234 depicted in FIG. 2A) may further determine whether global motion exists for the respective blocks $k_1$, $k_2$ (503). According to one example, image processing module 214 may compare, for each respective block, the average flow magnitude to a predetermined threshold value $T_2$ as shown by the following equation:

$$B_{k_1,k_2} = \begin{cases} 1 & \text{if } \frac{1}{L^2} \sum_{x=k_1 L}^{(k_2+1)L-1} \sum_{y=k_2 L}^{(k_2+1)L-1} |V_{x,y}| \geq T_2 \\ 0 & \text{otherwise} \end{cases}, \quad (7)$$

where $V_{x,y}$ is the optical flow vector at pixel location (x,y) as described above with respect to FIG. 4. |X| may represent an $L^2$-norm of the vector X.

Predetermined threshold value $T_2$ may be selected based on empirical analysis of video presentation frames that may be known to include global motion or not, but could be also be adaptively determined or defined in other ways. If the average flow magnitude for the block is greater than or equal to predetermined threshold value $T_2$, then image processing module 214 may determine global motion to exist for the respective block. Accordingly, image processing module 214 may assign a global motion flag (e.g., $B_{k1, k2}$) for the respective block $k_1$, $k_2$ a value of 1 (504). If the average flow magnitude for the block is less than predetermined threshold value T2, then image processing module 214 may determine global motion not to exist for the block. Accordingly, a global motion flag (e.g., $B_{k1, k2}$) for the respective block $k_1$, $k_2$ may be assigned value of 0 (505).

As also depicted in FIG. 5, image processing module 214 may determine if global motion exists for frames $f_N$, $f_N+1$ (506). Image processing module 214 may determine if global motion exists for frames $f_N$, $f_N+1$ by summing the respective global motion flags (e.g., $B_{k1, k2}$) for the respective blocks $k_1$, $k_2$ of frames $f_N$, $f_N+1$. Image processing module 214 may further compare the result of the summation of the respective global motion flags a threshold value $T_3$. Predetermined threshold value $T_3$ may be selected based on empirical analysis of video presentation frames that may be known to include global motion or not, but could be also be adaptively determined or defined in other ways. If summation of the respective global motion flags is greater than the threshold value $T_3$, image processing module 214 may determine global motion to exist for frames $f_N$, $f_N+1$ (507). However, if summation of the respective global motion flags is less than the threshold value $T_3$, image processing module 214 may determine global motion not to exist for frames $f_N$, $f_N+1$ (508).

Referring back to FIG. 3, if global motion is not determined to exist for frames $f_N$, $f_N+1$, then image processing module 214 (e.g., mask/depth map creation sub-module 240 depicted in FIG. 2A) may proceed to classify one or more pixels and/or objects of frame $f_N$ as forward or background objects (308) as described in further detail below. However, if global motion determined to exist for frames $f_N$, $f_N+1$, image processing module 214 (e.g., global motion estimation sub-module 236 depicted in FIG. 2A) may estimate global motion for at least one pixel of frames $f_N$, $f_N+1$ (306). In some examples, image processing module 214 may estimate global motion by determining one or more global motion parameters.

As also shown in FIG. 3, image processing module 214 (e.g., global motion adjustment sub-module 238 depicted in FIG. 2A) may adjust an initial indication of image depth (e.g., optical flow determined at step 304) based on estimated global motion (e.g., as determined at step 306) (307). In one example, image processing module 214 may adjust an initial indication of image depth by applying determined global motion parameters to the initial indication of image depth. According to one example, where the initial indication of image depth is determined based on optical flow as described above with respect to FIG. 5, image processing module 214 may adjust a velocity vector (optical flow motion vector) of at least one pixel of frame $f_N$ to compensate for estimated global motion. For example, image processing module 214 may apply one or more determined global motion parameters to a velocity vector of at least one pixel of frame $f_N$ to create a global motion adjusted velocity vector.

According to one example, estimation of global motion for at least one pixel may be determined based on a model of camera movements. The example of a camera movement model described below is an 8-parameter perspective model, however a camera movement model as described herein may include any number of parameters without exceeding the scope of this disclosure. For example, a 2-parameter translational model, or a 6-parameter affine models may also be used consistent with other examples of this disclosure.

According to an 8-parameter perspective model, a relationship between an original point location (x, y) of frame $f_N$ and a corresponding point location (x', y') of the frame $f_N+1$ may be represented by the following equations:

$$x' = \frac{ax + by + c}{px + qy + 1} \quad (8)$$

$$y' = \frac{dx + ey + f}{px + qy + 1},$$

Where the variables a, b, c, d, e, f, p and q are the 8 parameters of the perspective model. Accordingly, image processing module 214 may determine values for the respective parameters according to analysis of at least one optical flow vector for frames $f_N$, $f_N+1$. Although these equations may represent non-linear transform functions, in some examples these equations may be reformed into linear equations.

Reforming these equations into linear form may be advantageous, because they may require less computation to be solved.

According to one example, a 2D point in Euclidian coordinate representation may have a corresponding homogenous representation. For example, a 2D point in an image plane point $[x, y]^T$ may be represented as $[\tilde{x},\tilde{y},\tilde{w}]^T$ by introducing an extra component $\tilde{w}$. Unlike x and y components, which represent horizontal and vertical directions in Euclidian coordinates, extra component $\tilde{w}$ may not have a physical meaning. In some examples, $[\tilde{x},\tilde{y},\tilde{w}]^T$ be reverse mapped to Euclidian coordinates as shown by the following equations:

$$x = \frac{\tilde{x}}{\tilde{w}} \quad (9)$$

$$y = \frac{\tilde{y}}{\tilde{w}},$$

According to the homogeneous representation, point representation may not vary with scaling. For example, vectors $[\overline{x},\overline{y},1]^T$ and $[\overline{xw},\overline{yw},\overline{w}]^T$ may represent the same point in a 2D image plane, because their Euclidian coordinate representations may be the same according to equation (9) above.

For example, assume points $[x, y]^T$ and $[x', y']^T$ are two corresponding points in two image frames that are projected from the same real world voxel but at different times. According to the homogeneous representation described above, non-linear mapping according to the 8-parameter perspective model for frame $f_N$ may be represented by the following equations:

$$x' = \frac{ax + by + c}{px + qy + 1} \quad (8)$$

$$y' = \frac{dx + ey + f}{px + qy + 1},$$

These equations may further be represented by the following linear matrix operation:

$$\begin{pmatrix} x'w \\ y'w \\ w \end{pmatrix} = H \begin{pmatrix} x \\ y \\ 1 \end{pmatrix} \quad (10)$$

where $$H = \begin{pmatrix} h_{11} & h_{12} & h_{13} \\ h_{21} & h_{22} & h_{23} \\ h_{31} & h_{32} & 1 \end{pmatrix},$$

The above linear matrix operation (10) is a 3 by 3 non-singular matrix with 8 degrees of freedom. The matrix H may be referred to as a homography matrix between two image planes. The above linear matrix operation may be mapped to Euclidian coordinates using the equations $$x = \frac{\tilde{x}}{\tilde{w}} \text{ and} \quad (9)$$

$$y = \frac{\tilde{y}}{\tilde{w}}$$

described above as represented by the following equations:

$$x' = \frac{x'w}{w} = \frac{h_{11}x + h_{12}y + h_{13}}{h_{31}x + h_{32}y + 1} \quad (11)$$

$$y' = \frac{y'w}{w} = \frac{h_{21}x + h_{22}y + h_{23}}{h_{31}x + h_{32}y + 1},$$

which have the same form as the transform functions $$x' = \frac{ax + by + c}{px + qy + 1} \text{ and} \quad (8)$$

$$y' = \frac{dx + ey + f}{px + qy + 1}$$

described above.

The equations $$x' = \frac{x'w}{w} = \frac{h_{11}x + h_{12}y + h_{13}}{h_{31}x + h_{32}y + 1} \text{ and}$$

$$y' = \frac{y'w}{w} = \frac{h_{21}x + h_{22}y + h_{23}}{h_{31}x + h_{32}y + 1}$$

may further be written in the form:

$$\begin{pmatrix} x & y & 1 & 0 & 0 & 0 & -xx' & -yx' \\ 0 & 0 & 0 & x & y & 1 & -xy' & -yy' \end{pmatrix} \begin{pmatrix} h_{11} \\ h_{12} \\ h_{13} \\ h_{21} \\ h_{22} \\ h_{23} \\ h_{31} \\ h_{32} \\ h_{33} \end{pmatrix} = \begin{pmatrix} x' \\ y' \end{pmatrix}. \quad (12)$$

Therefore, given a point pair correspondence $[x, y]^T$ and $[x', y']^T$, the above two equations $$x' = \frac{x'w}{w} = \frac{h_{11}x + h_{12}y + h_{13}}{h_{31}x + h_{32}y + 1} \text{ and} \quad (11)$$

$$y' = \frac{y'w}{w} = \frac{h_{21}x + h_{22}y + h_{23}}{h_{31}x + h_{32}y + 1}$$

may be used to describe global motion. Theoretically, with 8 degrees of freedom (corresponds to 8 unknown parameters), at least 4 point pairs may be used to solve the linear matrix equation (12).

To estimate parameters of the 8-parameter perspective model described above, image processing module 214 may formulate one or more pixels in the form of equation (12) above. However, some pixels may impact the accuracy of the parameters of equation (12). For example, pixels that belong to homogeneous intensity areas might not have correctly estimated motions according to equation (12). Thus, according to some examples, image processing module may select candidate pixels of frames $f_N$, $f_N+1$ to reduce a number of pixels for which global motion parameters are determined.

Figure 6:
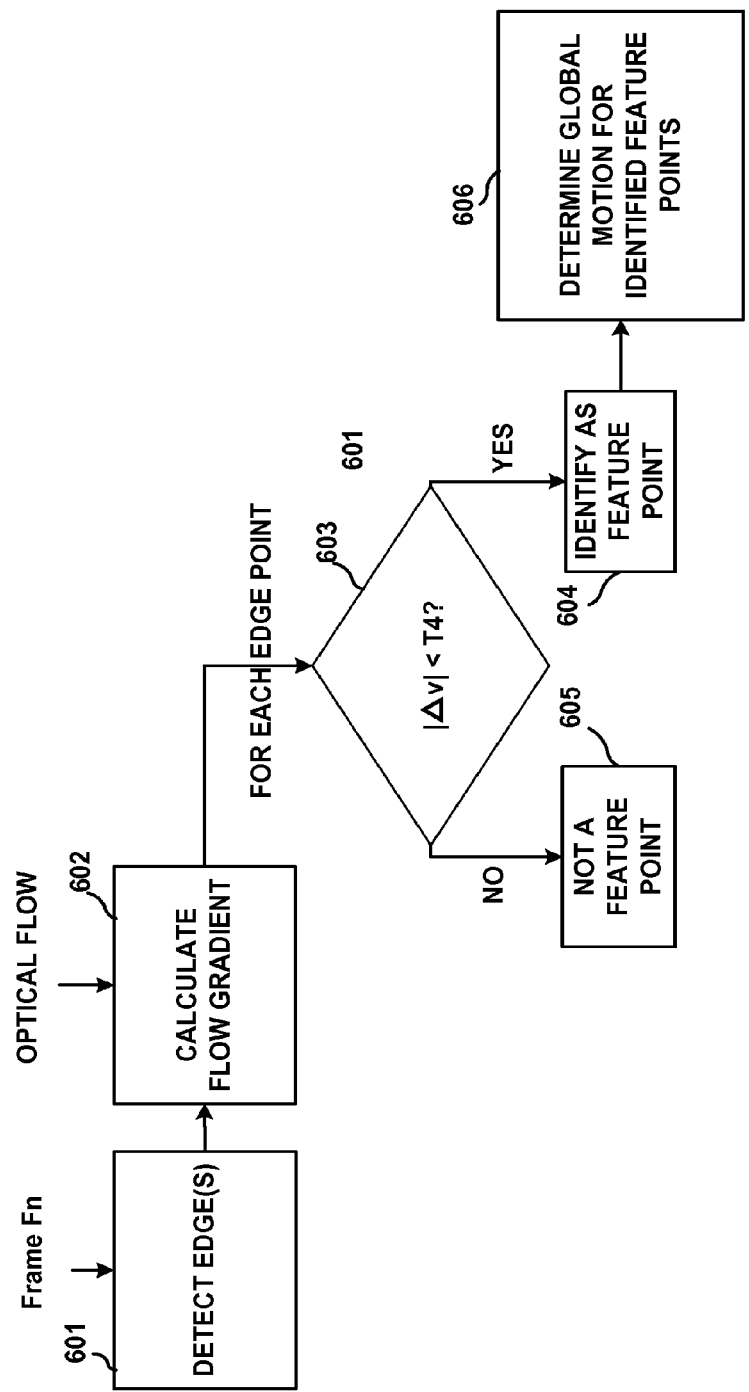
FIG. 6 is a flow diagram that illustrates one example of a method of identifying feature points for the estimation of global motion consistent with the techniques of this disclosure.

FIG. 6 is a flow chart diagram that illustrates one example of image processing module 214 selection of candidate pixels consistent with the techniques of this disclosure. According to this example, image processing module 214 may perform edge detection to determine one or more edge pixels of frame $f_N$ (601). For example, where an object of frame $f_N$, is a person's face, an edge of the person's face may be detected. Edge detection as described herein may be performed according to various techniques known in the art. Such techniques are not explicitly described herein.

Image processing module 214 may further determine a first order gradient value $\Delta v$ for an optical flow vector $V=[v_x, v_y]^T$ for at least one pixel of frames $f_N$, $f_N+1$ (602). According to one example, image processing module 214 may determine a first order gradient value $\Delta v$ for all pixels of frames $f_N$, $f_N+1$. In other examples, image processing module 214 may determine a first order gradient value $\Delta v$ for a subset of pixels of frames $f_N$, $f_N+1$, e.g. those pixels identified as edge pixels at step 601.

As shown in FIG. 6, image processing module 214 may further determine, for each identified edge pixel, whether an absolute value of the determined first order gradient value $|\Delta v|$ is greater than a predetermined threshold value $T_4$ (603). Predetermined threshold value $T_4$ may be selected based on empirical analysis of pixels that may be known to be desirable as feature points, but could be also be adaptively determined or defined in other ways. If the absolute value of the determined first order gradient value $|\Delta v|$ is less than or equal to the predetermined threshold value $T_4$, then image processing module may select the pixel as a feature point for determining global motion (604). However, if the absolute value of the determined first order gradient value $|\Delta v|$ is greater than the predetermined threshold value $T_4$, then image processing module 214 may not select the pixel as a feature point for estimating global motion for frame $f_N$, $f_N+1$ (605). As shown in FIG. 6, image processing module 214 may use selected feature point pixels to determine depth for frame $f_N$, e.g., to determine global motion for frame $f_N$ (606). For example, image processing module 214 may use selected feature point pixels to determine one or more global motion parameters according to a model of camera movement (e.g., a perspective model) as described above.

Referring back to FIG. 3, as discussed above, image processing module 214 (e.g., global motion adjustment sub-module 238 depicted in FIG. 2A) may further adjust an initial indication of image depth to compensate for global motion (307). According to one example, image processing module may adjust an initial indication of image depth by applying determined global motion parameters to an initial indication of depth (e.g., optical flow at step 304) for frames $f_N$, $f_N+1$ to compensate for global motion. Accordingly, global motion-adjusted optical flow may be created. According to one example, for each pixel position (x, y) of frame $f_N+1$, a corresponding global motion adjusted position (x', y') may be determined according to equation (12). For example, image processing module 214 may represent global motion for each pixel according to the following equations:

$$\text{global\_}v_x = x - x'$$

$$\text{global\_}v_y = y - y' \qquad (13),$$

An initial indication of image depth (e.g., as determined at step 304 in FIG. 3) may be based on both local and global motion. As such, image processing module 214 may compensate for global motion by subtracting global motion from the initial indication of image depth. Where the initial indication of image depth is optical flow, an optical flow may be represented as an optical flow vector $V=[v_x, v_y]^T$ for each pixel. An adjusted flow vector may therefore be represented by the equation $V'=[v'_x, v'_y]^T$ where:

$$v'_x = v_x - \text{global\_}v_x, \text{ and}$$

$$v'_y = v_y - \text{global\_}v_y \qquad (14),$$

A global motion-adjusted frame, $f'_N+1$, may be regarded as a frame captured at time $t+\delta t$ as if there were no camera movement from time t to $t+\delta t$. Image processing module 214 may set an intensity of pixel (x', y') of frame $f'_N+1$ with the same intensity of pixel (x, y) of frame $f_N+1$. For example:

$$I'_{N+1,(x',y')} = I_{N+1,(x,y)} \qquad (15),$$

While an initial indication of depth (e.g., optical flow as determined at step 304 in FIG. 3) may refer to an estimation of a difference between frames $f_N$ and $f_N+1$ of a video presentation, a global motion-compensated frame difference, as described herein, may represent a difference between frame $f_N$ and a global motion-adjusted frame $f'_N+1$. For example:

$$\text{Frm\_DiffN} = f_N - f'_{N+1} \qquad (16),$$

According to the above-described techniques, for a global motion-adjusted optical flow for a frame, background objects of the frame that are still in the real world may appear static, even if the original frame included global motion. Accordingly, only foreground moving objects that have local motion may have motion in a global motion-adjusted frame. Accordingly, image processing module 214 may determine a depth map with greater accuracy, as global motion has been removed. As described above, a depth map may be a map of values indicating a relative depth of pixels and/or objects of a video frame.

In some examples, the perspective model described above with respect to equations (8) to (12) may not be integer. In some examples, to reduce computational complexity, image processing module 214 may round the values (x', y') to a nearest integer, and an intensity of $I_{N+1,(x,y)}$ may be assigned to an integer pixel position value (x', y'). If a corresponding position (x', y') is beyond a boundary of the video frame, image processing module 214 may discard the pixel. According to another example, more than one pixel location (x, y) may be mapped to an integer position (x', y'). According to this example, image processing module 214 may set an intensity value at (x', y') to an average of intensity values for all pixels. If no pixel is mapped to a particular pixel location (x', y'), image processing module 214 may obtain an intensity for the pixel location by interpolation from a determined intensity of one or more neighboring pixel locations.

Figure 7:
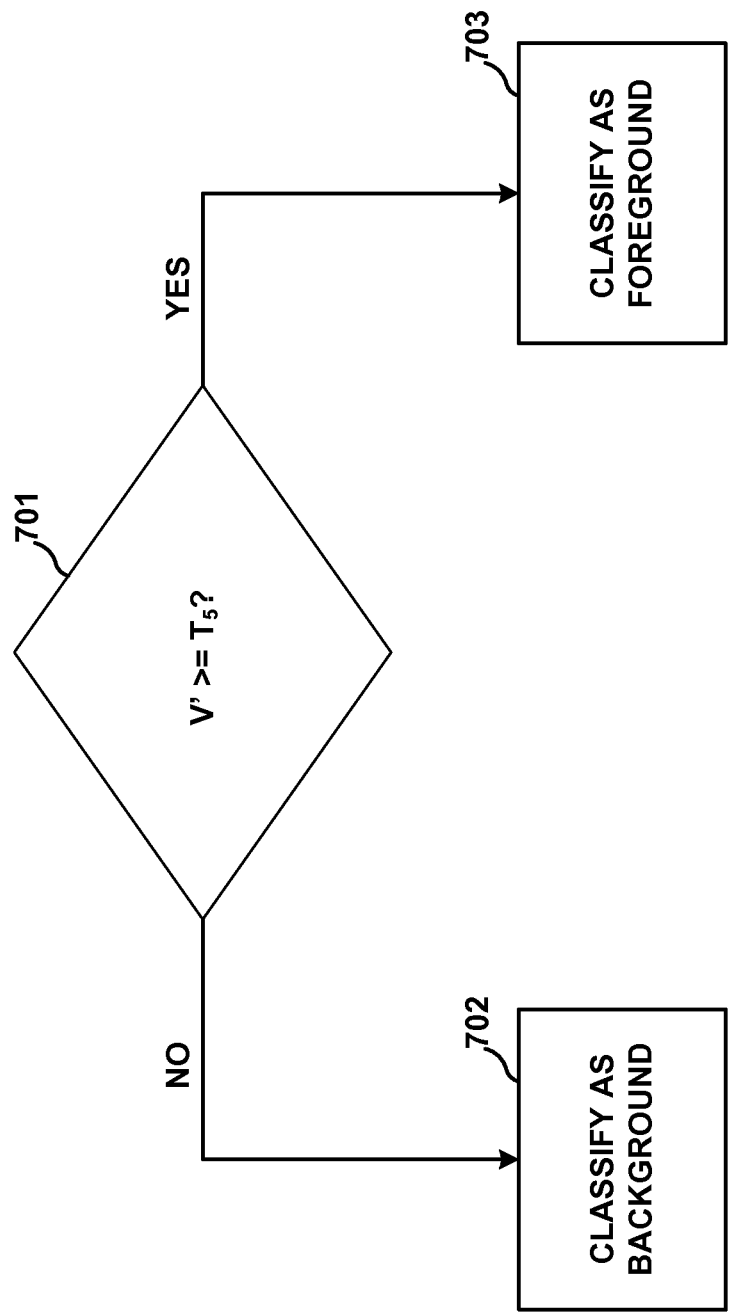
FIG. 7 is a flow diagram that illustrates one example of a method of classifying image pixels/objects as foreground/background consistent with the techniques of this disclosure.

Referring back to FIG. 3, whether or not global motion was determined to exist (e.g., at step 305 in FIG. 3), image processing module 214 (e.g., mask/depth map creation sub-module 240 depicted in FIG. 2A) may further classify objects and/or pixels of frame $f_N$ as either foreground or background objects based on either an optical flow for frame $f_N$, or a global motion-adjusted optical flow for frame $f_N$ (308). FIG. 7 illustrates one example of image processing module 214 classification of frame pixels and/or objects as foreground or background objects consistent with the techniques of this disclosure. For example, as shown in FIG. 7, image processing module 214 (e.g., mask/depth map creation sub-module 240 depicted in FIG. 2A) may compare an optical flow vector (e.g. global motion-adjusted, or non-global motion-adjusted, if at step 305 frame $f_N$ was not determined to include global motion) to a predetermined threshold $T_5$ to determine whether or not an object of an image is a foreground or background object (701). Predetermined threshold value $T_5$ may be selected based on empirical analysis of objects and/or pixels of video presentation frames that may be known to be foreground and/or background object or pixels, but could be also be adaptively determined or defined in other ways. In some examples, image processing module 214 may compare the optical flow to the predetermined threshold $T_5$ for each pixel of frame $f_N$. In other examples, image processing module 214 may compare the optical flow to the predetermined threshold $T_5$ for subset of pixels of frame $f_N$. For example, image processing module may select pixels for comparison based on edge detection as described above, or any other technique for determining which pixels of a frame make up an image object of the frame.

As also shown in FIG. 7, if the optical flow for a pixel is less than or equal to the predetermined threshold $T_5$, image processing module 214 may classify the pixel as being part of a background object (702). However, if the optical flow for a pixel is greater than the predetermined threshold $T_5$, image processing module 214 may classify the pixel as being part of a foreground object (703).

Referring back to FIG. 3, in some examples, based on the classification of objects as foreground or background objects at step 308 of the method of FIG. 3, image processing module 214 (e.g., mask/depth map creation sub-module 240 depicted in FIG. 2A) may create an initial foreground/background mask (309). A mask as described herein may be a digital representation of those areas of an image frame that have been classified as foreground objects, and those areas that have been classified as background objects. For example, a mask as described herein may represent foreground pixels in white color, while background pixels are represented by another color, such as black. Image processing module 214 may use a mask as described herein to generate at least one alternative view of a 2D video presentation, such that foreground images appear in the foreground when a 3D presentation is displayed to a viewer, and background pixels appear in the background when the 3D presentation is displayed to the viewer.

Figure 8:
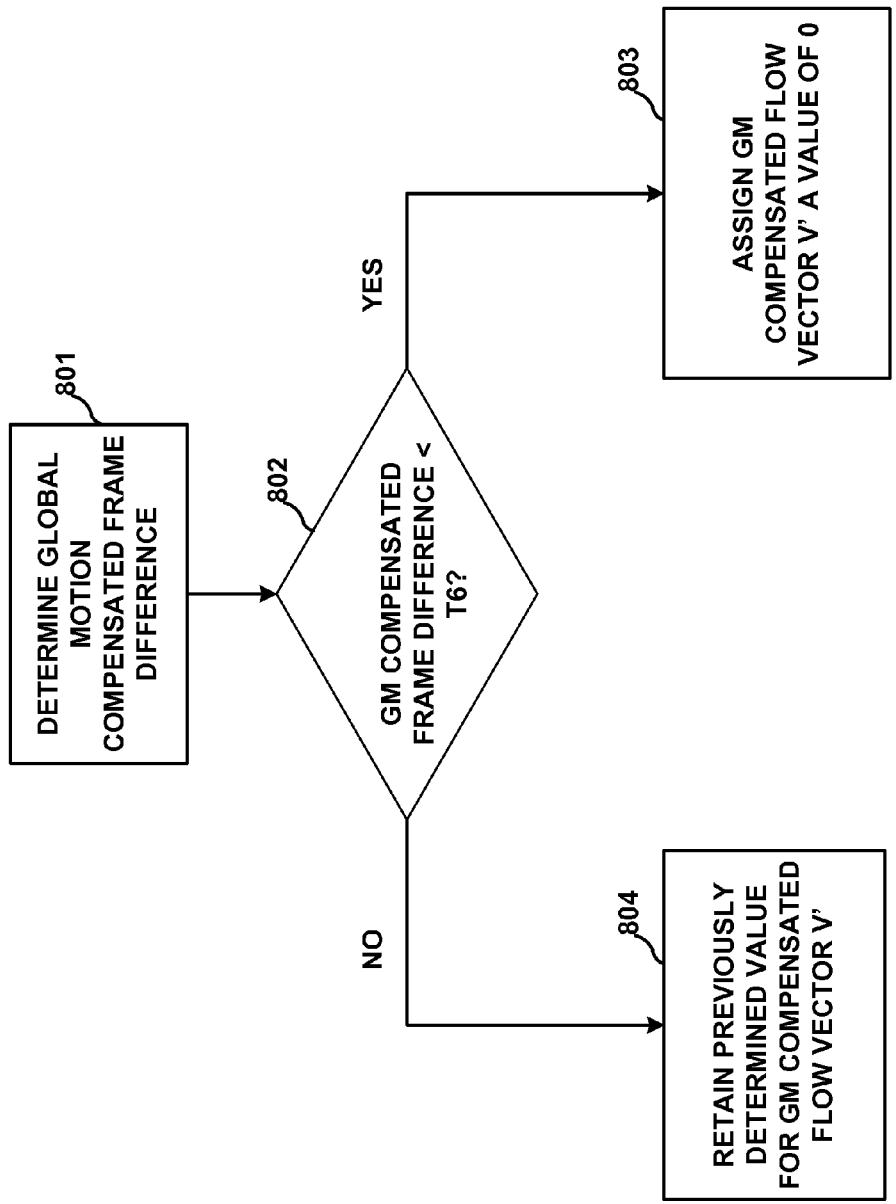
FIG. 8 is a flow diagram that illustrates one example of a method of refining an initial mask for a video presentation consistent with the techniques of this disclosure.

As also shown in FIG. 3, in some examples, image processing module 214 (e.g., mask/depth map creation sub-module 240 depicted in FIG. 2A) may further refine an initial foreground/background mask (310). FIG. 8 is a flow diagram that illustrates one example of a method of refining an initial foreground/background mask. In some examples, a video presentation may include one or more regions that include little or no texture (hereinafter "homogenous intensity areas"). Optical flow vectors for those homogeneous intensity areas may be substantially equal to zero although camera movement is detected. As a result, a global motion-adjusted optical flow vector V' (e.g., obtained according to equation (16) described above) may be inaccurate. In some examples, an initial foreground/background mask (e.g., as determined at step 308 of FIG. 3), may not be accurate for homogenous intensity areas. As such, in some examples, image processing module 214 may refine an initial foreground/background mask to account for inaccuracy due to homogenous intensity areas of a frame.

As depicted in FIG. 8, image processing module 214 (e.g., mask/depth map creation sub-module 240 depicted in FIG. 2A) may refine an initial foreground/background mask by determining a global motion-adjusted frame difference between frame $f_N$ and frame $f_N+1$ (801). Determining the global motion-adjusted frame difference may include, for each pixel of frames $f_N$, $f_N+1$, an average frame difference of neighborhood pixels. In one such example, a 2P+1 by 2P+1 window (e.g., where frames $f_N$, $f_N+1$ have been broken up into 2P by 2P blocks) may be used to calculate an average frame difference, however other window sizes are also contemplated. According to examples where a 2P+1 by 2P+1 window is used, image processing module may apply the below equation for at least one pixel of frames $f_N$, $f_N+1$ to determine an average frame difference:

$$\frac{1}{(2M+1)^2} \sum_{i=-P}^{P} \sum_{j=-P}^{P} |f_{N,(x+1,y+j)} - f_{N+1,(x+1,y+j)}|, \quad (17)$$

Image processing module 214 may further compare a determined global motion-adjusted frame difference to a predetermined threshold $T_6$ (802). Predetermined threshold value $T_6$ may be selected based on empirical analysis of pixels of video presentation frames that may be known to be errantly classified as foreground and/or background, although other techniques may also be used to define the thresholds described herein. If the determined global motion-adjusted frame difference is less than predetermined threshold value $T_6$ for a particular pixel, then it may be assumed that the pixel is likely a background pixel. As such, image processing module 214 may assign a value of zero to a global motion-adjusted flow vector V' for the pixel (804). However, if the determined global motion-adjusted frame difference is greater than or equal to the predetermined threshold value $T_6$ for a particular pixel, then image processing module 214 may assign the pixel the same global motion-adjusted flow vector V' as was previously determined (e.g., as was determined at step 307 of the method illustrated in FIG. 3) (803).

It may be advantageous for image processing module 214 to refine a global motion-adjusted optical flow for a frame $f_N$ according to the method illustrated in FIG. 8, because pixels of homogenous intensity areas, if the pixel is likely a background pixel, may be assigned a global motion-adjusted flow vector V' of 0. As such, image processing module 214 may create a refined mask in which homogenous intensity pixels are classified as background objects, and thereby reduce or eliminate inconsistencies that may be caused by homogenous intensity areas of a video frame.

Referring back to FIG. 3, image processing module 214 (e.g., mask/depth map creation sub-module 240 depicted in FIG. 2A) may further post-process either of an initial foreground/background mask, or a refined foreground background mask (collectively referred to as "initial mask" hereinafter), to create a final segmentation mask for the video presentation (311). Image processing module 214 may post-process an initial mask by identifying relatively small regions of foreground/background pixels in the initial mask. Such relatively small regions of foreground/background pixels may be caused by noise and/or misclassification of pixels in the initial mask. In some examples, image processing module 214 may remove such relatively small regions, e.g., by classifying pixels of the relatively small regions as background pixels for a final segmentation mask, or by classifying pixels of relatively small foreground regions as background pixels for creation of a final segmentation mask.

In some examples, image processing module 214 may post-process of an initial mask by performing binary image contour analysis. Binary image contour analysis may include detecting internal contour and external contour in the initial mask. A contour may be an outline of a frame object, e.g., an edge or line that defines or bounds a shape or object of frame $f_N$. An external contour may be described as a contour where no other contours exist inside that contour. An internal contours may be described as a contour inside another contour.

According to binary image contour analysis, image processing module 214 may compare respective areas of internal and/or external contours to one or more thresholds to determine whether they represent noise in the initial mask. For example, for external contours, if an area of the external contour is less than a predetermined threshold value $T_7$, image processing module 214 may identify that contour to include noise in the initial masks. Accordingly, if the area of the external contour is less than the predetermined threshold value $T_7$, image processing module 214 may categorize pixels of the contour as background pixels for a final segmentation mask. For internal contours, if an area of the internal contour is less than a predetermined threshold $T_8$, image processing module may identify that contour to include noise in the initial mask. Accordingly, if the area of the internal contour is less than the predetermined threshold $T_8$ image processing module 214 may categorize pixels of the contour as foreground pixels for a final segmentation mask. The post-processing techniques described above may smooth an initial mask for a frame $f_N$. As such, image processing module 214 may create a more accurate final segmentation mask for frame $f_N$.

Referring back to FIG. 3, image processing module 214 may create a depth map for the 2D view of the video presentation acquired at step 301 of FIG. 3 (312). In one example, image processing module 214 may create a depth map based on a final segmentation mask, e.g., a final segmentation mask created at step 310 of FIG. 3. In other examples, image processing module 214 may create a depth map based on an initial foreground/background mask (e.g., created at step 308 of FIG. 3), or a refined foreground/background mask (e.g., created at step 309 of FIG. 3). Hereinafter, a final segmentation mask, initial foreground/background mask, and refined foreground/background mask are collectively referred to as a "mask." A mask as described herein may be a digital representation of those areas of an image frame that have been classified as foreground objects, and those areas that have been classified as background objects. For example, a mask as described herein may represent foreground pixels in white color, while background pixels are represented by another color, such as black. Image processing module 214 may use a mask as described herein to generate at least one alternative view of a 2D video presentation, such that foreground images appear in the foreground when a 3D presentation is displayed to a viewer, and background pixels appear in the background when the 3D presentation is displayed to the viewer.

To create a depth map, image processing module 214 (e.g., mask/depth map creation sub-module 240 depicted in FIG. 2A) may assign a depth value to each pixel based on a mask for a frame. For example, image processing module 214 may assign a larger depth value to foreground pixels corresponding to objects with local motion, indicating that the foreground pixels are closer to an observer (e.g., a camera that captured the 2D view of the video presentation). In contrast, image processing module 214 may assign a smaller depth value to background pixels, indicating that the background pixels are further away from an observer. According to one example, image processing module 214 may assign depth values according to pixel color as described by the following equation:

$$d_{N,(x,y)} = \begin{cases} C_{N,(x,y)} & \text{if pixel}(x, y) \in \text{foreground} \\ \beta \cdot C_{N,(x,y)} & \text{if pixel}(x, y) \in \text{background} \end{cases} \quad (18)$$

where $C_{N,(x,y)}$ indicates a color value of frame $f_N$ at a pixel (x, y), and $\beta$ indicates a scaling factor, which may be less than 1. In various examples, $C_{N,(x,y)}$ may represent any type of color value, non-limiting examples of which include RGB (Red, Green, Blue) values, cyan, magenta, yellow and black (CMYK) values or, Luminance and Chrominance values.

In some examples, image processing module 214 (e.g., mask/depth map creation sub-module 240 depicted in FIG. 2A) may further smooth a depth map. In one such example, image processing module 214 may smooth a depth map using an asymmetric Gaussian blur filter. According to this example, blurring strength along a horizontal direction may be stronger than along a horizontal direction of the asymmetric Gaussian blur filter.

In some examples, image processing module 214 may set a final depth map for a frame $f_N$ as a weighted average of a filtered initial depth (e.g., as described above with respect to equation (18)). For example, image processing module 214 may represent a final depth map of a previous frame $f_N-1$ by the following equation.

$$d_N = w \cdot d_N + (1-w) \cdot d_{N-1} \quad (19),$$

In various examples, image processing module 214 may use a depth map created according to the techniques of this disclosure to create a video presentation that may be displayed such that it appears 3D to a user (e.g., such that the video presentation appears to have depth). According to one such example, image processing module 214 may use a depth map to create one or more alternate views of a video presentation. The one or more alternate views of the video presentation may be configured to be displayed along with an original 2D view of the video presentation (e.g., such as acquired at step 301 of FIG. 3), or another alternative view of the video presentation, such that when the respective views are displayed together, the video appears substantially 3D to a user. For example, a display control module 218 may cause a display 219 to present the respective views to be viewed by a viewer's right eye, and a viewer's left eye. Differences between the respective views may cause a user to perceive a displayed video presentation in substantially three dimensions. In some such examples, image processing module 214 may generate an alternative view such that differences between the alternative views and another view (e.g., original 2D view, or other alternative view) may be selected based on a depth map for pixels of the respective views created consistent with the techniques of this disclosure. As such, in some examples, the techniques of this disclosure may provide for a more accurate conversion of a 2D video presentation to a 3D video presentation.

Figure 9:
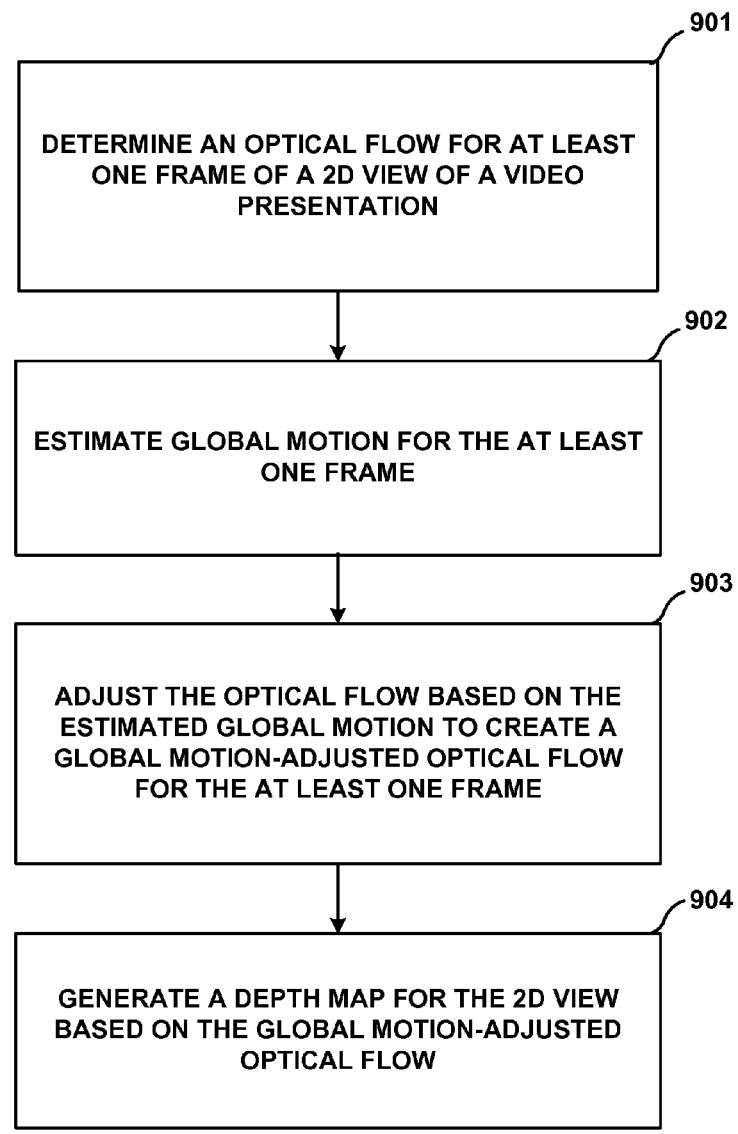
FIG. 9 is a flow diagram that illustrates one example of a method for determining at least one foreground pixel of a 2D view of a video presentation consistent with the techniques of this disclosure.

FIG. 9 is a flow chart diagram that illustrates one example of a method consistent with the techniques of this disclosure. As shown in FIG. 9, image processing module 214 determines an optical flow for at least one frame of a two-dimensional (2D) view of a video presentation (901). The optical flow may be a representation of an apparent motion of object brightness patterns in a visual plane caused by relative motion between an observer of the 2D view and objects of the 2D view. In some examples, the optical flow may provide at least one initial indication of image depth for the at least one example. In one example, an optical flow may be determined for each pixel of the at least one frame. As also shown in FIG. 9, image processing module 214 may further includes estimate global motion for the at least one frame (902). According to one example, image processing module 214 may estimate global motion for the at least one frame via estimating based on a model of camera movement (e.g., an 8-parameter perspective model), as described above. For example, estimating global motion may include determining at least one global motion parameter for the at least one frame (e.g., as described above with respect to step 304 of FIG. 3). As also shown in FIG. 9, image processing module 214 may modify the optical flow based on the estimated global motion to create a global motion-adjusted optical flow for the at least one frame (903). In one example, image processing module 214 may modify the optical flow via applying at least one global motion parameter to the optical flow to create the global motion-adjusted optical flow for the at least one frame (e.g., as described above with respect to step 307 in FIG. 3). As also shown in FIG. 9, image processing module 214 may identify at least one foreground pixel of the at least one frame based on the global motion-adjusted optical flow (904). In some examples, the identified at least one foreground pixel may be used to create a depth map for the at least one frame of the video presentation. A depth map created based on a global motion-adjusted optical flow for the at least one frame may be used to create a video presentation that is perceived as substantially three-dimensional by a viewer.

FIG. 6 depicts an example of a technique for selecting candidate pixels as feature points for determining global motion. According to the technique described in FIG. 6, edge detection is performed to determine one or more edge pixels of a frame $f_N$, and feature points of the edge pixels are selected based on whether an absolute value of the determined first order gradient value is greater than a predetermined threshold value $T_4$. According to other examples consistent with the techniques of this disclosure, feature points for use in determining global motion may be selected based on other considerations, as described below with respect to FIGS. 10-13.

Figure 10:
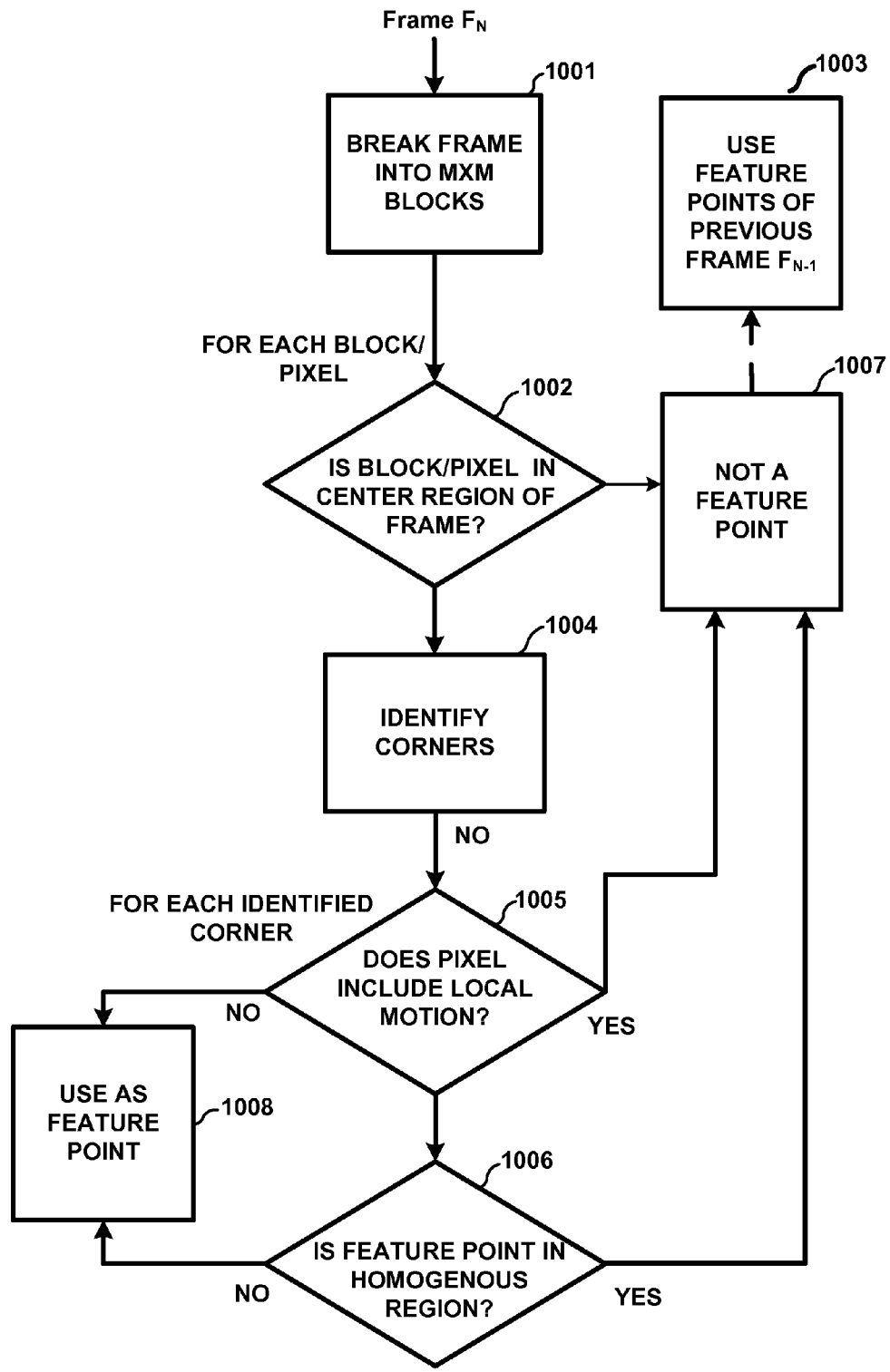
FIG. 10 is a flow diagram that illustrates one example of a method for identifying feature points for the estimation of global motion consistent with the techniques of this disclosure.

FIG. 10 is a flow chart diagram that illustrates another example of a method of selecting of candidate pixels for use as feature points for estimating/compensating for global motion consistent with the techniques of this disclosure. As depicted in FIG. 10, image processing module 214 may divide a frame $F_N$ into a plurality of blocks (e.g., M by M blocks) (1001). Image processing module 214 may determine, for each block (and/or each pixel within a block), whether the blocks/pixel is in a center region of a frame (1002). As described in greater detail below, this determination of whether the blocks/pixel is in a center region of a frame can be used in selecting candidate pixels for use as feature points.

Figure 11:
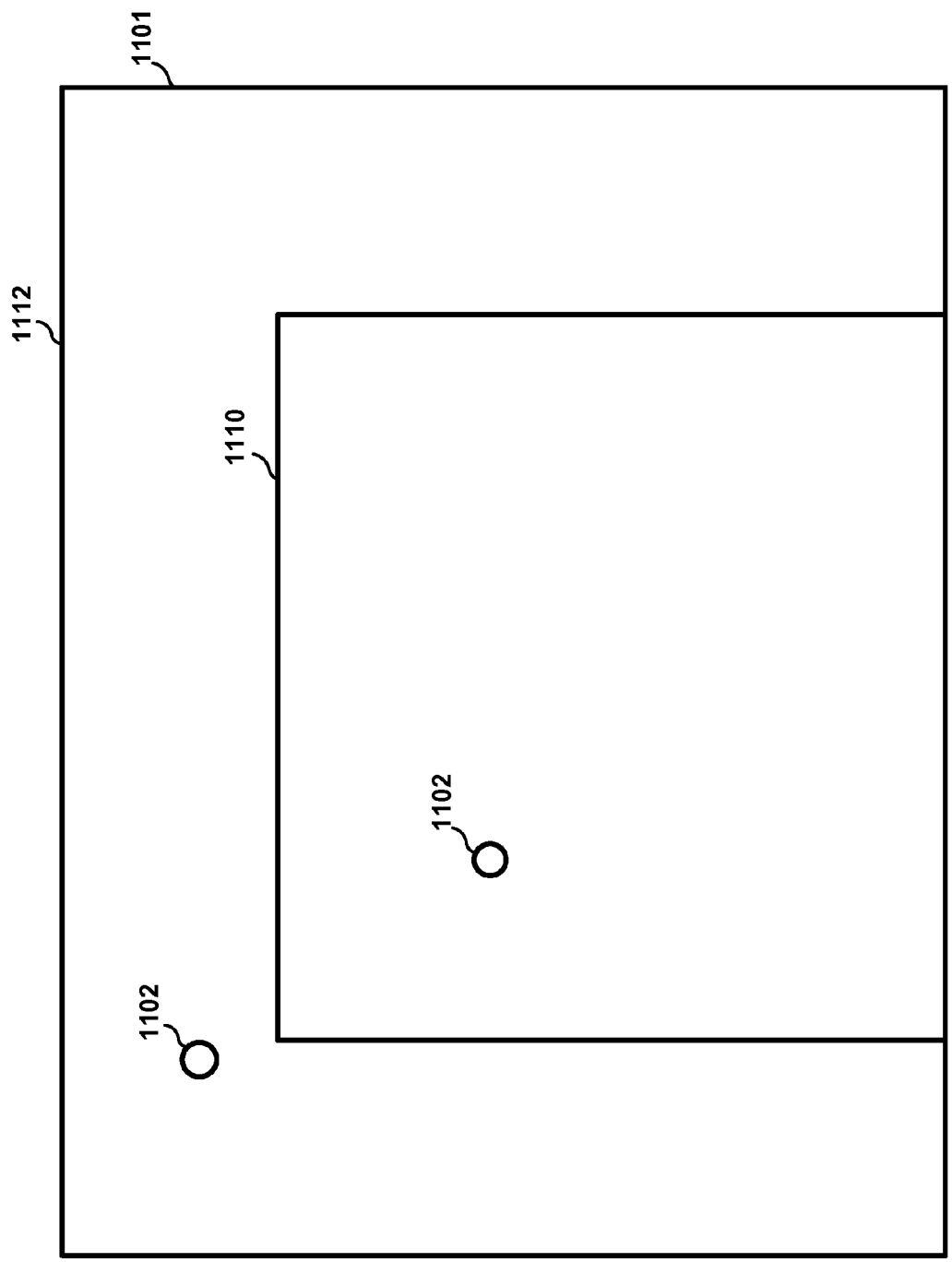
FIG. 11 is a conceptual diagram illustrating a frame with a central region and a peripheral region consistent with the techniques of this disclosure.

FIG. 11 is a conceptual diagram that depicts one example of a frame 1101 of image date that includes such a center region 1110. As shown in FIG. 11, a frame 1101 includes a center region 1110 and a peripheral region 1112, which includes a left side, upper, and right side portions of frame 1101. As also depicted in FIG. 11, pixel 1102 is located within center region 1110, while a pixel 1102 is located outside of center region 1110 (e.g., within peripheral region 1112).

Referring back to FIG. 10, if a block/pixel is within a center region 1110 of a frame 1101 (e.g., pixel 1102) image processing module 214 may not use the pixel and/or pixels within a blocks as a feature point for global motion estimation/compensation (1007). Instead, image processing module 214 may, in some examples, use image data regarding one or more previously identified feature points from at least one previous frame $F_{N+1}$ for purposes of determining global motion (1003).

However, for blocks/pixels outside of center region 1110 (e.g., within peripheral region 1112), image processing module 214 may identify pixels of one or more corner regions (1004). A corner region in an image may identify a region (or point, e.g., pixel) where two non-parallel edges of an image cross one another. A corner region may also be described as a region (point) for which there are two dominant and different edge directions in a local neighborhood of the region/point. To determine one or more corner regions, image processing module 214 may utilize any technique for identifying edge and/or corner regions within an image, such as, for example, the Harris corner detection technique, which may make use of the multi-scale Harris operator. Other examples of techniques for edge and/or corner identification techniques that may be utilized to determine one or more corner regions as described above include techniques such as using the Kirsh-Operator, the Frei-Chen masking set, the Moravec corner detection algorithm, the Harris & Stephens/Plessey/Shi-Tomasi corner detection algorithm, the level curve curvature approach, the Laplacian of Gaussian (LoG), Difference of Gaussians (DoG), Determination of Hessian (DoH) algorithms, affine-adapted interest point operators, the Wang and Brady corner detection algorithm, the smallest Univalue Segment Assimilating Nucleus (SUSAN), Trajkovic and Hedly corner detection, Accelerated Segment Test (AST) based feature detectors, automatic synthesis of detectors (e.g., introduced by Trujillo and Olague), or any other technique for determining one or corner regions and/or pixels of a frame.

In some examples, image processing module 214 may limit a number of candidate pixels (e.g., pixels of corner regions) per block of a frame that are used as feature points. For example, image processing module may only identify a predetermined number of candidate pixels per block. For example, image processing module may only identify five to ten candidate pixels per block of a frame.

According to another example, image processing module 214 may identify the pixels of corner regions of a frame, but only utilize a predetermined number identified pixels that are most significant as candidate pixels. In this case, image processing module 214 may utilize a predetermined number of pixels of a block with a largest intensity value to determine feature points. For example, image processing module 214 may identify all corner regions of a block, but only select 5-10 pixels per block with a largest intensity value as candidate pixels. According to still another example, image processing module 214 may utilize only those pixels with an intensity value greater than a predetermined threshold as candidate pixels. In some examples, image processing module 214 may not identify any pixels of a particular block as candidate pixels (e.g., for homogenous regions of a frame).

In some examples, image processing module 214 may further reduce a number of candidate pixels used to determine global motion. For example, as depicted in FIG. 10, image processing module 214 may further determine whether a candidate pixel includes local motion (1005). If the candidate pixel includes local motion, image processing module 214 may not identify the pixel as a feature point (1007). Instead, image processing module 214 may use image data from at least one other frame as a feature point (1003). If the candidate pixel does not include local motion, image processing module 214 may identify the candidate pixel as a feature point for use in determining global motion (1008).

As also depicted in FIG. 10, image processing module 214 may also, or instead, determine whether a candidate pixel is part of a homogenous region of a frame. For example, image processing module 214 may determine that one or more characteristics of neighboring pixels share the same or substantially similar values as a candidate pixel. If a candidate pixel is located in a homogenous region of a frame, image processing module 214 may not use the candidate pixel as a feature point (1007). Instead, in some examples, image processing module 214 may use image data from at least one other frame as a feature point (1003). If the candidate pixel is not located in a homogenous region of a frame, image processing module 214 may identify the candidate pixel as a feature point for use in determining global motion (1008).

The technique described above with respect to FIG. 10 may be advantageous for a number of reasons. For example, by selecting a number of feature points based on the criteria depicted in FIG. 10, a computational complexity of determining a depth map may be reduced. Furthermore, using image data of at least one previous frame as feature points of a center region of a frame (and/or otherwise undesirable pixels, such as local motion and/or pixels of homogenous regions) may further reduce computational complexity of determining a depth map.

FIGS. 3 and 9 and the description above describes generating a depth map of a 2D image based on determining global motion for a frame, and modifying a representation of optical flow for a frame based on the estimated global motion to create a global motion-adjusted optical flow for the frame. FIG. 8 and the corresponding description above describe that image processing module 214 may refine an initial foreground/background mask by determining and using a global motion-adjusted frame difference between frames $F_N$ and $F_{N+1}$.

According to other examples consistent with the techniques of this disclosure, image processing module 214 may use a global-motion compensated frame difference (e.g., as described above with respect to FIG. 8) to determine a depth map instead of a global motion adjusted frame as described above. According to this example, image processing module 214 may not determine a global motion adjusted frame. Instead, image processing module 214 may determine a depth map only based on a global motion compensated frame difference. By using a global-motion compensated frame difference to determine a depth map, computational complexity and/or memory used to determine a 3D depth map for a 2D image may be reduced.

In some examples, image processing module 214 may determine a global motion compensated frame difference $Frm\_Diff_N$ (see equation (16) above). Such a global motion compensated frame difference $Frm\_Diff_N$ may refer to a difference between a frame $f_N$ and a global motion compensated frame $f'_{N+1}$. In some examples, image processing module 214 may determine a global motion compensated frame difference based on one or more global motion parameters estimated based on one or more feature points of an frame selected as described above with respect to the examples of FIGS. 6 and 10 described above.

Figure 12:
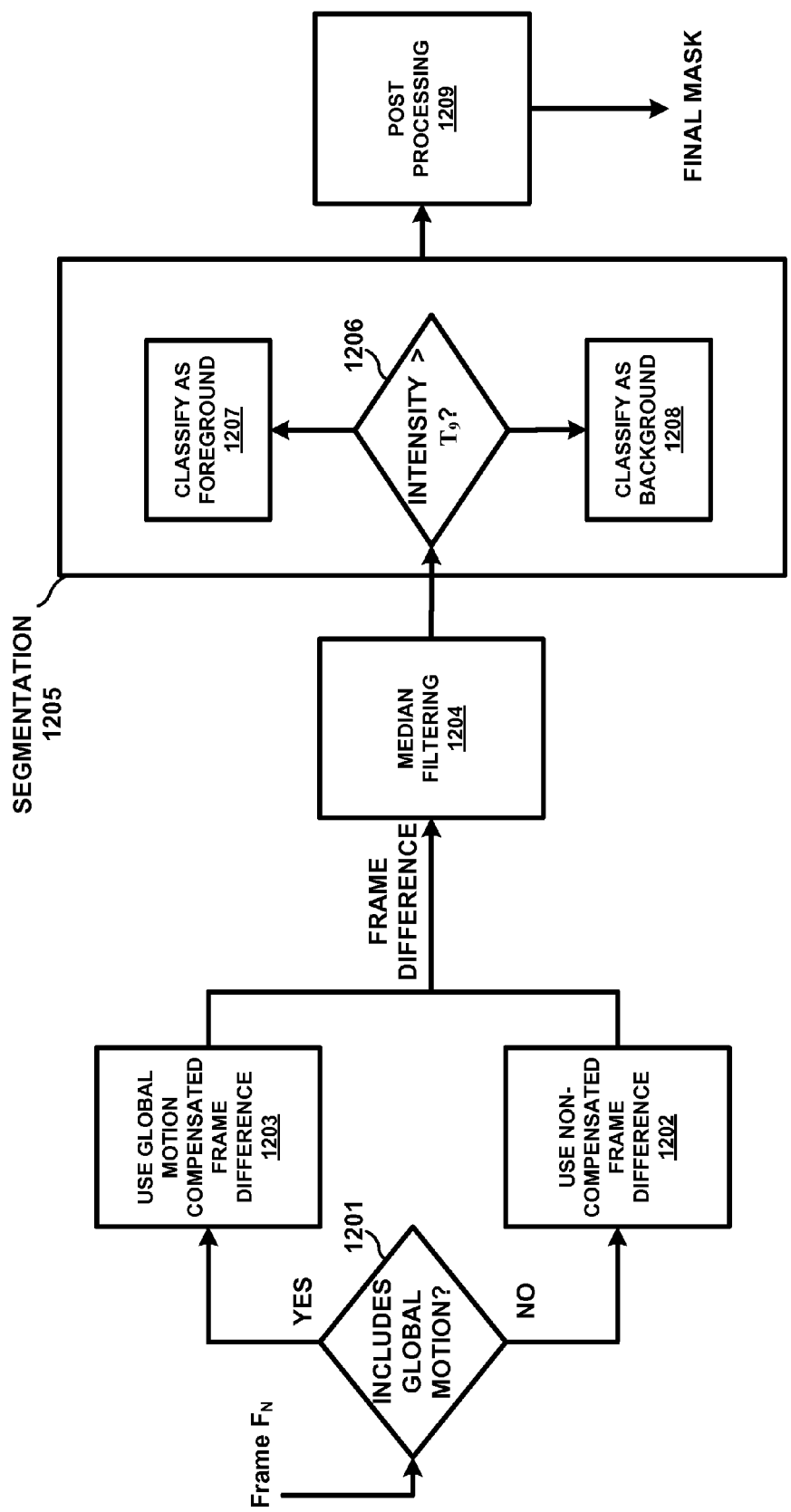
FIG. 12 is a flow diagram that illustrates one example of a method for determining a depth map for a 2D image consistent with the techniques of this disclosure.

FIG. 12 is a flow chart diagram that illustrates one example of a method of determining a depth map for a 2D image consistent with the techniques of this disclosure. As shown in FIG. 12, image processing module 214 (e.g., mask/depth map creation sub-module 240 depicted in FIG. 2A), may determine whether global motion exists (e.g., as described above with respect to FIG. 5) (1201). If global motion does not exist in the frame, image processing module 214 may use a non-compensated frame difference $|f'_{N+1} - f_{N+1}|$ to determine a segmentation mask (1202). If global motion does exist for the frame, image processing module 214 may determine a global motion compensated frame difference (1203). Image processing module 214 may apply median filter to the determined frame difference (e.g., global motion compensated frame difference or non compensated frame difference) (1204). The median filter may reduce noise in the determined frame difference.

Image processing module 214 may further perform segmentation on a frame to classify image objects (and/or pixels) as foreground or background (1205). For example, as depicted in FIG. 12, image processing module 214 may compare an intensity of a frame difference for an object and/or pixel to a predetermine intensity threshold $T_9$ (1206). If an intensity of the frame difference is greater than the threshold $T_9$, image processing module 214 may identify the object and/or pixel as a foreground object (1207). However, if an intensity of the frame difference is less than the threshold $T_9$, image processing module 214 may identify the object and/or pixel as a background object (1208). Based on segmenting the frame, image processing module 214 may generate a binary mask for the frame (not depicted in FIG. 12). Image processing module may further apply morphological filtering (e.g., using one or more open or closed morphological filters) to the binary mask (also not depicted in FIG. 12). Image processing may generate an initial foreground/background mask for the frame (also not depicted in FIG. 12).

Image processing module 214 may also post process the initial foreground/background mask (1209). For example, image processing module may post process the initial foreground/background mask as described above with respect to FIG. 3 to generate a final mask. As described above, image processing module 214 may use the final mask to generate a depth map for a 3D image. The depth map may be used to cause different images to be presented to a viewer's right and left eyes, and thereby cause the image to appear 3D to the viewer.

Figure 13:
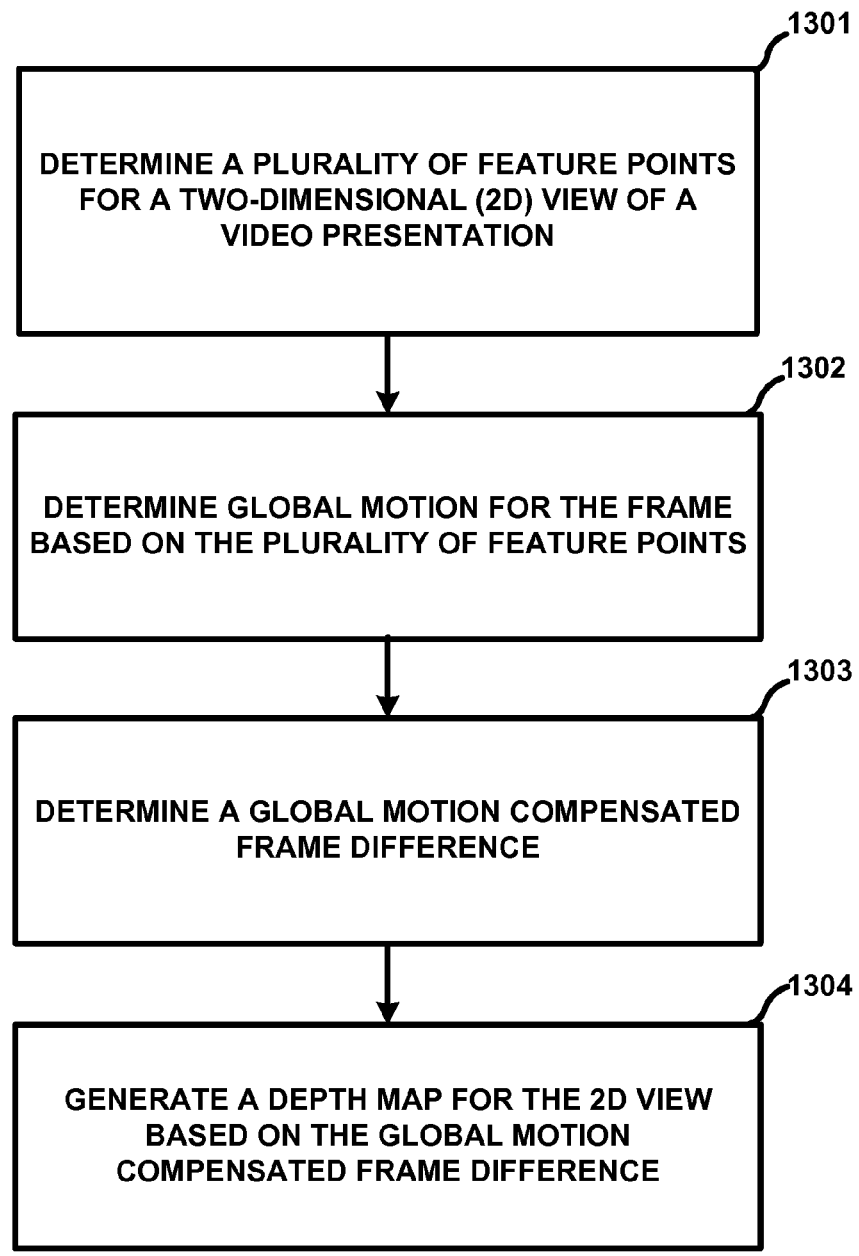
FIG. 13 is a flow diagram that illustrates one example of a method for determining a depth map for a 2D image consistent with the techniques of this disclosure.

FIG. 13 is a flow diagram that illustrates one example of a method for determining a depth map for a 2D image consistent with the techniques of this disclosure. As depicted in FIG. 13, image processing module 214 determines, for a two-dimensional (2D) view of a video presentation, a plurality of feature points for a frame of the video presentation (1301). For example, image processing module may determine the plurality of feature points based on one or more of whether a pixel of the frame are in a central region of the frame, whether the pixel includes local motion, and/or whether the pixel is in a homogenous region of the frame.

The image processing module 214 determines global motion for the frame based on the plurality of feature points (1302). The image processing module 214 further determines a global motion compensated frame difference (1303). The image processing module further determines a depth map for the 2D view of the video presentation based on the global motion compensated frame difference (1304). The depth map may be used to cause at least one image to appear substantially 3D to a viewer.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples been described. These and other examples are within the scope of the following claims.

The invention claimed is:

1. A method of determining a depth map for a two-dimensional view of a video presentation, comprising:
   determining, via an image processing module of a computing device for a two-dimensional (2D) view of a video presentation, a plurality of feature points for a frame of a video presentation by determining whether one or more blocks or pixels of the frame are in a center region of the frame;
   determining global motion for the frame based on the plurality of feature points;
   determining a global motion compensated frame difference for the frame, the global motion compensated frame difference indicating a difference between the frame and a global motion compensated frame; and
   generating a depth map for the frame based on the determined global motion and the determined global motion compensated frame difference for the frame, and if the one or more blocks or pixels of the frame are in the center region of the frame, using pixel information from at least one previous frame to generate the depth map for the one or more blocks or pixels in the center region of the frame.

2. The method of claim 1, wherein generating the depth map comprises classifying at least one pixel of the frame as a foreground pixel or a background pixel based on the global motion compensated frame difference.

3. The method of claim 2, wherein classifying at least one pixel of the frame as a foreground pixel or a background pixel comprises comparing an intensity of the global motion compensated frame difference for the at least one pixel to a predetermined threshold.

4. The method of claim 1, wherein determining the plurality of feature points comprises: identifying pixels of one or more corner regions of the frame.

5. The method of claim 4, wherein the identifying the pixels of the one or more corner regions comprises using Harris corner Detection to identify the pixels of the one or more corner regions.

6. The method of claim 1, wherein determining the plurality of feature points comprises: determining whether a pixel includes local motion.

7. The method of claim 1, wherein determining the plurality of feature points comprises:
   determining whether a pixel is located in a homogenous region of the frame; and
   selecting the pixel for determining the plurality of feature points based on the determination.

8. A device configured to determine a depth map for a two-dimensional (2D) view of a video presentation, comprising: an image processing module configured to:
   determine a plurality of feature points for a frame of a video presentation based on whether one or more blocks or pixels of the frame are in a center region of the frame;
   determine global motion for the frame based on the plurality of feature points;
   determine a global motion compensated frame difference for the frame, the global motion compensated frame difference indicating a difference between the frame and a global motion compensated frame; and
   generate a depth map for the frame based on the determined global motion and the determined global motion compensated frame difference for the frame, and if the one or more blocks or pixels of the frame are in the center region of the frame, use pixel information from at least one previous frame to generate the depth map for the one or more blocks or pixels in the center region of the frame.

9. The device of claim 8, wherein the image processing module is further configured to: generate the depth map based on classifying at least one pixel of the frame as a foreground or a background pixel based on the global motion compensated frame difference.

10. The device of claim 9, wherein the image processing module is further configured to: classify the at least one pixel of the frame as foreground or background pixels based on comparing an intensity of the global motion compensated frame difference for the at least one pixel to a predetermined threshold.

11. The device of claim 8, wherein the image processing module is further configured to: determine the plurality of feature points based on identifying pixels of one or more corner regions of the frame.

12. The device of claim 11, wherein the image processing module is further configured to: identify the pixels of one or more corner regions of the frame using Harris corner Detection to identify the pixels of the one or more corner regions.

13. The device of claim 8, wherein the image processing module is further configured to: determine the plurality of feature points based on whether a pixel includes local motion.

14. The device of claim 8, wherein the image processing module is further configured to: determine the plurality of feature points based on whether a pixel is located in a homogenous region of the frame.

15. A device configured to determine a depth map for a two-dimensional (2D) view of a video presentation, comprising:
   means for determining a plurality of feature points for a frame of a video presentation via a means for determining whether one or more blocks or pixels of the frame are in a center region of the frame;
   means for determining global motion for the frame based on the plurality of feature points;
   means for determining a global motion compensated frame difference for the frame, the global motion compensated frame difference indicating a difference between the frame and a global motion compensated frame; and
   means for generating a depth map for the frame based on the determined global motion and the determined global motion compensated frame difference for the frame, and if the one or more blocks or pixels of the frame are in the center region of the frame, means for using pixel information from at least one previous frame to generate the depth map for the one or more blocks or pixels in the center region of the frame.

16. The device of claim 15, wherein the means for generating the depth map further comprise: means for classifying at least one pixel of the frame as a foreground pixel or a background pixel based on the global motion compensated frame difference.

17. The device of claim 16, wherein the means for classifying the at least one pixel of the frame as a foreground pixel or a background pixel comprise: means for comparing an intensity of the global motion compensated frame difference for the at least one pixel to a predetermined threshold.

18. The device of claim 15, wherein the means for determining the plurality of feature points comprise: means for identifying pixels of one or more corner regions of the frame.

19. The device of claim 18, wherein the means for determining the plurality of feature points comprise: means for using Harris Corner Detection to identify the pixels of the corner regions.

20. The device of claim 15, wherein the means for determining the plurality of feature points comprise: means for determining whether a pixel includes local motion.

21. The device of claim 15, wherein the means for determining the plurality of feature points comprise: means for determining whether a pixel is located in a homogenous region of the frame and for selecting the pixel for determining the plurality of feature points based on the determination.

22. A non-transitory computer-readable storage medium comprising instructions that upon execution cause one or more processors to:
   determine a plurality of feature points for a frame of a video presentation based on whether one or more blocks or pixels of the frame are in a center region of the frame;
   determine global motion for the frame based on the plurality of feature points;
   determine a global motion compensated frame difference for the frame, the global motion compensated frame difference indicating a difference between the frame and a global motion compensated frame; and
   generate a depth map for the frame based on the determined global motion, and the determined global motion compensated frame difference for the frame, and if the one or more blocks or pixels of the frame are in the center region of the frame, use pixel information from at least one previous frame to generate the depth map for the one or more blocks or pixels in the center region of the frame.

23. The non-transitory computer-readable storage medium of claim 22, wherein the instructions further cause the processor to: generate the depth map based on classifying at least one pixel of the frame as a foreground pixel or a background pixel based on the global motion compensated frame difference.

24. The non-transitory computer-readable storage medium of claim 23, wherein the instructions further cause the processor to: classify at least one pixel of the frame as a foreground pixel or a background pixel based on comparing an intensity of the global motion compensated frame difference for the at least one pixel to a predetermined threshold.

25. The non-transitory computer-readable storage medium of claim 22, wherein the instructions further cause the processor to: determine the plurality of feature points based on identifying pixels of one or more corner regions of the frame.

26. The non-transitory computer-readable storage medium of claim 25, wherein the instructions further cause the processor to: identify the pixels of the one or more corner regions comprises using Harris corner Detection to identify the pixels of the one or more corner regions.

27. The non-transitory computer-readable storage medium of claim 22, wherein the instructions further cause the processor to: determine the plurality of feature points based on whether a pixel includes local motion.

28. The non-transitory computer-readable storage medium of claim 22, wherein the instructions further cause the processor to: determine the plurality of feature points based on whether a pixel is located in a homogenous region of the frame.

* * * * *